United States Patent [19]

Sato et al.

[11] Patent Number: 5,082,360
[45] Date of Patent: Jan. 21, 1992

[54] COMPOUND ZOOM LENS

[75] Inventors: Susumu Sato, Chiba; Koichi Wakamiya, Tokyo; Koichi Ohshita, Kawasaki, all of Japan

[73] Assignee: Nikon Corporation, Tokyo, Japan

[21] Appl. No.: 656,688

[22] Filed: Feb. 19, 1991

[30] Foreign Application Priority Data

Feb. 19, 1990 [JP] Japan ................................. 2-37678

[51] Int. Cl.$^5$ ..................... G02B 15/08; G02B 15/16
[52] U.S. Cl. .................................. 359/675; 359/692; 359/701
[58] Field of Search ................. 350/423, 427, 422; 359/675, 692, 701

[56] References Cited

U.S. PATENT DOCUMENTS

| | | | |
|---|---|---|---|
| 4,015,895 | 4/1977 | Hirose | 350/422 |
| 4,146,305 | 3/1979 | Tanaka | 350/422 |
| 4,240,697 | 12/1980 | Takano | 350/422 |
| 4,318,592 | 3/1982 | Tanaka | 350/422 X |
| 4,330,180 | 5/1982 | Tanaka | 350/422 X |

FOREIGN PATENT DOCUMENTS 63-43115 2/1988 Japan .
1-250917 10/1989 Japan .

Primary Examiner—Scott J. Sugarman
Attorney, Agent, or Firm—Shapiro and Shapiro

[57] ABSTRACT

A compound zoom lens optical system includes a variable focal length photographing lens consisting of a first lens group having a positive refracting power, and a second lens group having a negative refracting power from an object side in turn. A conversion lens is separably added to an image side of the variable focal length photographing lens. The conversion lens is simultaneously movable along an optical axis to be interlocked with at least one of the first and second lens groups of the variable focal length photographing lens so as to change a synthesized focal length with said variable focal length photographing lens. The variable focal length photographing lens and the conversion lens satisfy the following conditions:

$$-1.5 < \Phi_1/\Phi_2 < -0.8$$

$$-1.1 < \Phi_1/\Phi_{23} < -0.2$$

where $\Phi_1$ is the refracting power of the first lens group, $\Phi_2$ is the refracting power of the second lens group, and $\Phi_{23}$ is a synthesized refracting power of the second lens group and the conversion lens.

21 Claims, 11 Drawing Sheets

COMPOUND ZOOM LENS

BACKGROUND OF THE INVENTION

1. Field of the Invention

The present invention relates to a compact, high-variable power zoom lens and a variable power device, which are suitably used in a compact camera, an electronic still camera, and the like and, more particularly, to a compound zoom lens capable of changing a zooming range by adding an internal conversion lens along an optical path of a main lens, and a lens moving device for attaining the zooming operation.

2. Related Background Art

As a conventional photographing lens for a compact camera, a large number of zoom lenses each constituted by two lens groups, i.e., positive and negative lens groups have been proposed. For example, Japanese Laid-Open Patent Application No. 1-250917 proposed by the same applicant as the present invention is known.

A zoom lens constituted by four lens groups, i.e., positive, negative, positive, and negative lens groups is also known as a photographing lens for a compact camera, as disclosed in Japanese Laid-Open Patent Application No. 63-43115.

In the zoom lens constituted by the positive and negative lens groups disclosed in Japanese Laid-Open Patent Application No. 1-250917, however, a zoom lens in, e.g., the first embodiment of this patent application can have a compact structure since the total length at a wide-angle end is 53.35 mm. However, this zoom lens is not totally satisfactory since it has a zoom ratio of 2.19.

In Japanese Laid-Open Patent Application No. 63-43115, a high-variable power structure is attained by constituting the zoom lens by four lens groups, i.e., positive, negative, positive, and negative lens groups. For example, a zoom lens of the second embodiment disclosed in this patent application can have a zoom ratio as high as 2.76. However, in contrast to the former lens, the total length at a wide-angle end is 81.08 mm, resulting a large structure.

SUMMARY OF THE INVENTION

It is, therefore, an object of the present invention to provide a compact, high-performance compound zoom lens which can solve the problems of the conventional zoom lenses, can simultaneously attain a compact structure and a high-variable power structure, has excellent focusing performance in all the photographing magnification states, and can be assembled in a camera, and a variable power moving device for the zoom lens.

In order to achieve the above object, an optical system of the present invention is a compound zoom lens comprising a zoom lens, serving as a master lens, including a first group having a positive refracting power and a second group having a negative refracting power from an object side, and a conversion lens detachable from the zoom lens, and having a negative refracting power, wherein the conversion lens is attained in a zooming mode to prolong a synthesized focal length of the zoom lens and the conversion lens CL than a focal length of the zoom lens, and wherein when a zooming operation is performed with the conversion lens attached, the conversion lens is moved along an optical axis in cooperation with one of the two lens groups of the zoom lens, thereby continuously or discretely changing the synthesized focal length, and the compound zoom lens satisfies the following conditions:

$$-1.5 < \Phi_1/\Phi_2 < -0.8 \quad (1)$$

$$-1.1 < \Phi_1/\Phi_{23} < -0.2 \quad (2)$$

where $\Phi_1$ : the refracting power of the first group of the zoom lens $\Phi_2$ : the refracting power of the second group of the zoom lens $\Phi_{23}$ : the synthesized refracting power of the refracting power of the second group of the zoom lens, and the refracting power of the conversion lens In the compound zoom lens according to the present invention, the conversion lens having the negative refracting power is mounted, via a lens mounting means, in the zoom lens (master lens) which is relatively moved to perform a zooming operation in a first zooming range, and has a two-group (positive/negative) structure, thereby increasing a synthesized focal length of the zoom lens and the conversion lens. In this state, the conversion lens is moved in a direction of an optical axis by a conversion lens moving means in synchronism with movement of the respective groups constituting the zoom lens in the direction of the optical axis so as to contribute to a zooming operation, thus attaining an efficient zooming operation in a second zooming range.

According to the present invention, a compound zoom lens which is compact, has a very wide zooming photographing region, and has excellent focusing performance over the entire zooming photographing region, can be attained. Since a storage space of the conversion lens can be reduced, the compound zoom lens of the present invention is very suitably equipped in a compact camera.

The basic principle of the present invention is disclosed in U.S. application No. 405,678 (filing date: 1989, 8, 23) filed by the present applicant now U.S. Pat. No. 5,050,971. The present invention was established upon examination in more detail on the basis of the above-mentioned principle.

DESCRIPTION OF THE PREFERRED EMBODIMENTS

The preferred embodiments of the present invention will be described below with reference to the accompanying drawings.

Figure 1:
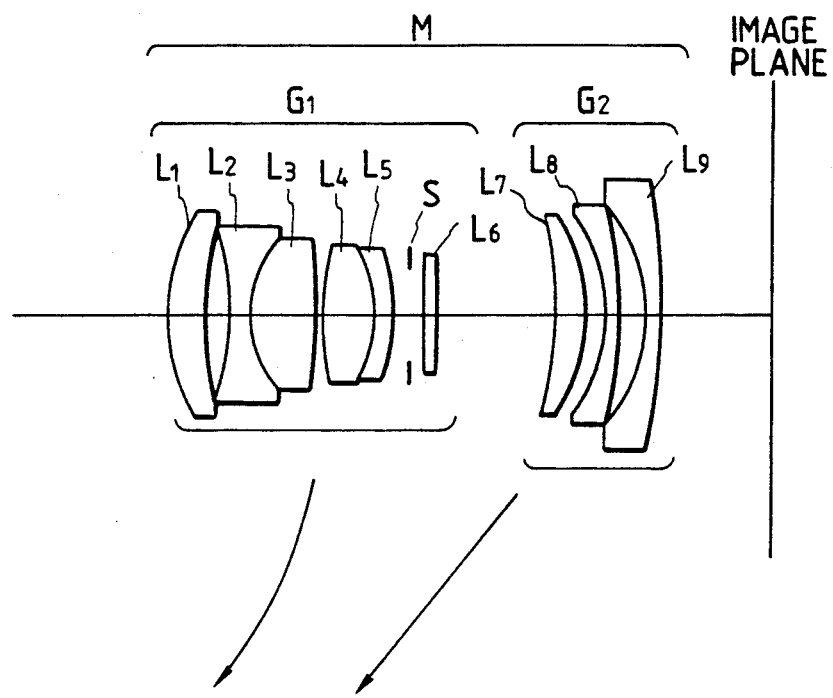
FIG. 1 is a view showing a lens structure of a zoom lens constituting two, i.e., positive and negative lens groups, which is used as a master lens in the first to third embodiments of the present invention.
Figure 2:
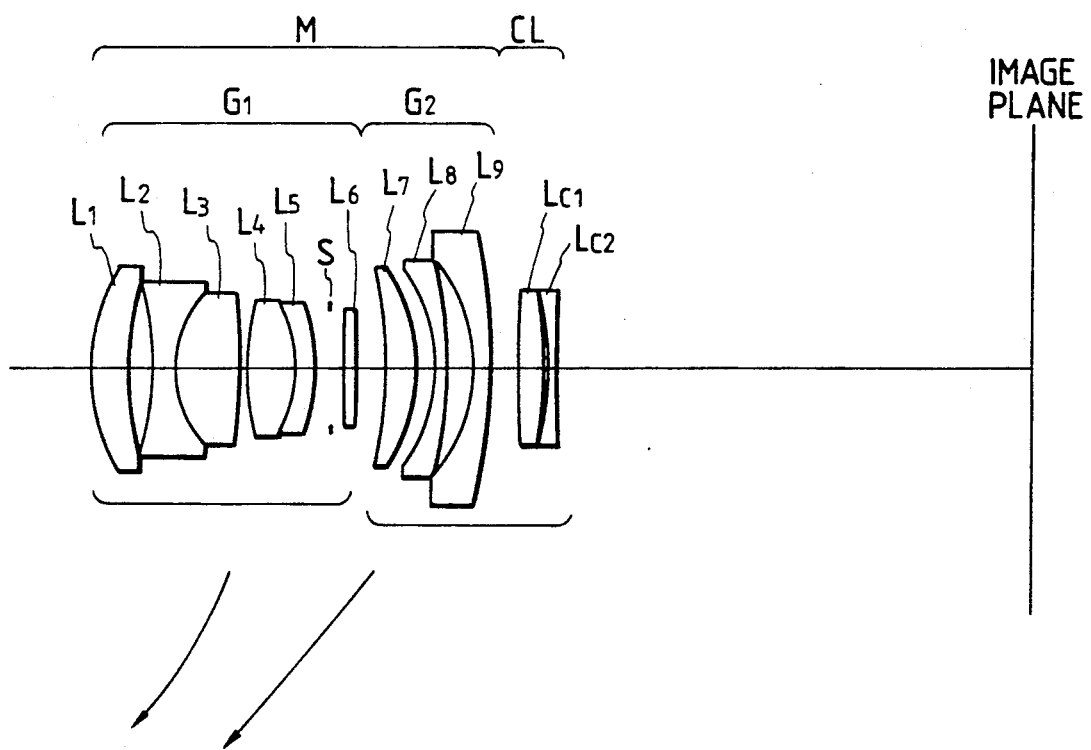
FIG. 2 is a view showing a lens structure of a compound zoom lens according to the first embodiment of the present invention.

FIG. 1 is a view showing a master lens (zoom lens) in the first embodiment according to the present invention, and FIG. 2 is a view of a compound zoom lens showing the first embodiment of the present invention, wherein a conversion lens is added to the master lens shown in FIG. 1.

As shown in FIGS. 1 and 2, a compound zoom lens of the present invention comprises a zoom lens M which serves as a master lens having a first group $G_1$ having a positive refracting power, and a second group $G_2$ having a negative refracting power in turn from an object side, and a conversion lens CL which is detachably arranged along an optical axis of the zoom lens M, and has a negative refracting power. When a zooming operation is performed with the conversion lens CL attached, the conversion lens CL is moved in the direction of the optical axis in synchronism with movement of the zoom lens M, a synthesized focal length is continuously or discretely changed, thereby increasing the synthesized focal length of the zoom lens M and the conversion lens CL to be larger than a focal length of the zoom lens M itself.

In order to decrease the total length of the compound zoom lens, the total length of the zoom lens as the master lens M must be decreased. For this purpose, according to the embodiment of the present invention, as a most advantageous arrangement for decreasing the total length, as shown in FIG. 1, the zoom lens having the two-group (positive/negative) structure is employed.

If a local length of the positive first group $G_1$ constituting the master lens M is represented by $f_1$, a focal length of the negative second group $G_2$ constituting the master lens M is represented by $f_2$, a principal point interval between the first and second groups $G_1$ and $G_2$ at a wide-angle end $W_1$ is represented by $D_W$, a principal point interval between the first and second groups $G_1$ and $G_2$ at a tele end $T_1$ is represented by $D_T$, and focal lengths of the master lens M at the wide-angle end $W_1$ and the tele and $T_1$ are respectively represented by $f_W$ and $f_T$, the following relations are satisfied:

$$\frac{1}{f_W} = \frac{1}{f_1} + \frac{1}{f_2} - \frac{D_W}{f_1 f_2} \qquad (1)$$

$$\frac{1}{f_T} = \frac{1}{f_1} + \frac{1}{f_2} - \frac{D_T}{f_1 f_2} \qquad (2)$$

$$0 < f_W < f_T \qquad (3)$$

$$f_1 \cdot f_2 < 0 \qquad (4)$$

From equations (1) and (2), we have:

$$\frac{1}{f_W} - \frac{1}{f_T} = \frac{(D_W - D_T)}{f_1 f_2} \qquad (5)$$

Thus, the left-hand side of equation (5) can be rewritten based on inequality (3) as follows:

$$\frac{1}{f_W} - \frac{1}{f_T} = -\frac{(f_T - f_W)}{f_T f_W} > 0 \qquad (6)$$

Therefore, $D_W > D_T$ can be satisfied based on relations (4), (5), and (6).

The conversion lens CL can be added in two ways. That is, the conversion lens CL may be arrange between the first and second groups $G_1$ and $G_2$, or may be arranged behind the second group $G_2$.

When the conversion lens CL is inserted between the first and second groups $G_1$ and $G_2$, a group interval enough to receive the conversion lens CL can be assured in a state at the wide-angle end $W_1$. In this state, however, it is impossible to efficiently increase a synthesized focal length to be larger than a focal length in a state at the tele end $T_1$. In addition, at the wide-angle end $W_1$, since the large group interval is assured, the positive refracting power of the zoom lens M itself is increased, and as a result, an arrangement for increasing the negative refracting power of the conversion lens CL must be adopted. This undesirably results in difficulty in aberration correction.

On the other hand, when the conversion lens CL is arranged behind the second group, a group interval between the first and second groups $G_1$ and $G_2$ of the zoom lens (master lens) M having the two-group (positive/negative) structure is minimized at the tele end $T_1$ from the relation $D_W \geq D_T$ obtained as described above. Therefore, in a state at substantially the tele end, since an air interval for receiving the conversion lens CL is assured behind the second group $G_2$, an arrangement for arranging the conversion lens CL behind the second group $G_2$ must be adopted.

When the conversion lens CL is moved in synchronism with movement of the respective lens groups constituting the master lens (two-group (positive/negative) zoom lens) while the conversion lens CL is arranged behind the second group $G_2$, an efficient zooming operation in a second variable power range ($W_2$-$T_2$) can be achieved. Therefore, a decrease in total length of an optical system and a high variable power ratio can be simultaneously attained.

Figure 3:
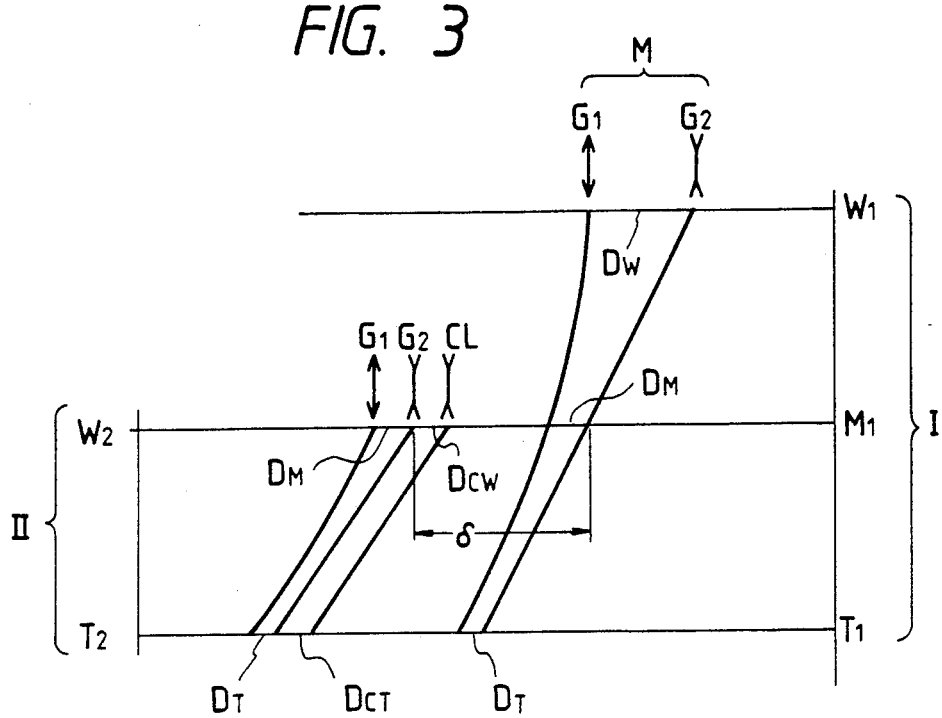
FIG. 3 is a chart for explaining moving paths of the lens groups in the compound zoom lens shown in FIG. 2.

In this case, since an image plane is moved upon insertion of the conversion lens CL, the master lens M is integrally extended toward the object side while a group interval $D_M$ between the two lens groups $G_1$ and $G_2$ of the master lens M in a predetermined magnification state of a first zooming range ($W_1$-$T_1$) is assured, and thereafter, the conversion lens CL is preferably inserted, as shown in FIG. 3. Thus, an insertion space of the conversion lens CL can be assured at the same time.

In a state wherein the conversion lens CL is arranged behind the second group $G_2$, a moving pattern for moving the conversion lens CL together with the second group $G_2$ constituting the master lens M is preferably employed. Since a variation in aberration caused by the variable power operation is mostly corrected by the master lens M, a load of aberration correction of the conversion lens CL can be reduced, so that the conversion lens CL can be rendered compact and can be constituted by a small number of lenses, as shown in FIG. 2. With the above-mentioned moving pattern, a mechanical arrangement of a lens barrel can be simplified, as will be described later.

When the above-mentioned moving pattern is employed, according to the present invention, a zooming operation in the second variable power range ($W_2$-$T_2$) can be attained as a zoom lens having a two-group structure as in the master lens M after the conversion lens CL is mounted.

A synthesized refracting power of the negative refracting power of the second group $G_2$ and the negative refracting power of the conversion lens CL in a state wherein the conversion lens CL is added is larger than the negative refracting power of the second group $G_2$ before the conversion lens CL is added.

For this reason, in order to obtain good optical performance in the entire zooming range while achieving a compact structure and a high zooming ratio at the same time, the refracting powers of the first and second groups $G_1$ and $G_2$ must be appropriately balanced in consideration of a refracting power difference before and after the conversion lens CL is added.

As an optimal power arrangement in consideration of the above-mentioned balance, the following conditions (1) and (2) are preferably satisfied:

$$-1.5 < \Phi_1/\Phi_2 < -0.8 \quad (1)$$

$$-1.1 < \Phi_1/\Phi_{23} < -0.2 \quad (2)$$

where $\Phi_1$ : the refracting power of the first group $G_1$ of the zoom lens M $\Phi_2$ : the refracting power of the second group $G_2$ of the zoom lens M $\Phi_{23}$ : the synthesized refracting power of the refracting power of the second group $G_2$ of the zoom lens, and the refracting power of the conversion lens CL Condition (1) represents the optimal power distribution of the zoom lens M having the two-group structure as the master lens, and condition (2) represents the optimal power distribution when the conversion lens CL is added.

When the lower limit of condition (1) is exceeded, a Petzval sum is increased in the negative direction, and a curvature of field caused by the master lens itself considerably occur in the positive direction. In order to correct the curvature of field, the number of lenses must be inevitably increased. As a result, a compact master lens M cannot be obtained. When the upper limit of condition (1) is exceeded, the total length of the master lens M is prolonged, and it is not preferable since the object of the present invention is disturbed.

When the lower limit of condition (2) is exceeded, the refracting power of the conversion lens CL is lowered, and a sufficiently wide zooming range (focal-point variable region) cannot be obtained by this conversion lens CL. When the upper limit of condition (2) is exceeded, the refracting power of the conversion lens CL is increased, and it is difficult to satisfactorily perform aberration correction by the conversion lens CL constituted by a small number of lenses.

Each group of the zoom lens M having the two-group (positive/negative) structure and serving as the master lens includes at least one positive lens and at least one negative lens, thereby satisfactorily correcting various aberrations such as a chromatic aberration. For this reason, various aberrations such as a chromatic aberration must be corrected in the conversion lens itself independently of the zoom lens M. For this purpose, the conversion lens CL must be constituted by at least one positive lens and at least one negative lens.

In a variable power mode in the first zooming range ($W_1$-$T_1$) of the zoom lens M having the two-group (positive/negative) structure and serving as the master lens, the conversion lens CL must be retreated outside a photographing optical path. When the optical system of the present invention is incorporated in, particularly, a compact camera, the conversion lens CL must be rendered compact to reduce a retreat space of the conversion lens CL. Therefore, in order to constitute the conversion lens CL by a minimum number of lenses and to keep a small thickness in the direction of the optical axis of the conversion lens CL, the conversion lens CL is preferably constituted by two lenses, i.e., a positive lens and a negative lens.

As the arranging order of the positive and negative lenses constituting the conversion lens CL, two ways of arrangements, that is, positive-negative and negative-positive arrangements from an object side in turn are available.

For example, when the conversion lens CL is constituted by negative and positive lenses from the object side in turn, a light beam passing through the master lens M is diverged by the negative lens, resulting in an increase in diameter of the positive lens arranged behind the negative lens. On the other hand, when the conversion lens CL is constituted by positive and negative lenses from the object side in turn, a light beam is converged by the positive lens. Therefore, the diameter of the negative lens arranged behind the positive lens can be decreased.

Therefore, when the conversion lens CL is constituted by a positive lens $L_{c1}$ and a negative lens $L_{c2}$ from the object side in turn, as shown in FIG. 2, the conversion lens itself can be rendered compact as a whole.

In order to cause the conversion lens itself to reliably perform good aberration correction, the conversion lens CL preferably satisfies the following conditions:

$$N_{c1} < 1.7 \tag{3}$$

$$N_{c2} - N_{c1} > 0.1 \tag{4}$$

where
$N_{c1}$: the refractive index of the positive lens $L_{c1}$ in the conversion lens with respect to d lines
$N_{c2}$: the refractive index of the negative lens $L_{c2}$ in the conversion lens with respect to d lines Condition (3) restricts the positive lens $L_{c1}$ in a range of types of glass having a relatively low refractive index, and condition (4) restricts the negative lens $L_{c2}$ in a range of types of glass having a relatively high refractive index. When the conversion lens CL is added in a zooming mode in the second zooming range ($W_2$-$T_2$), a good Petzval sum can be obtained as the entire optical system.

When the ranges of conditions (3) and (4) are exceeded, it is not preferable since the Petzval sum of the entire optical system is increased in the negative direction upon addition of the conversion lens CL in the zooming mode in the second zooming range ($W_2$-$T_2$), and a curvature of field considerably occurs.

The lenses constituting the conversion lens CL more preferably satisfy the following conditions:

$$\nu_{c1} < 45 \tag{5}$$

$$\nu_{c2} - \nu_{c1} > 4.0 \tag{6}$$

where
$\nu_{c1}$: the abbe number of the positive lens $L_{c1}$ in the conversion lens
$\nu_{c2}$: the abbe number of the negative lens $L_{c2}$ in the conversion lens Condition (5) restricts the positive lens $L_{c1}$ in a range of types of high-dispersion glass, and condition (6) restricts the negative lens $L_{c2}$ in a range of types of low-dispersion glass, so that the conversion lens itself can satisfactorily correct a chromatic aberration. When the ranges of conditions (5) and (6) are exceeded, it is difficult for the two, i.e., positive and negative lenses to realize chromatic aberration correction, and the number of constituting lenses is undesirably increased.

In order to satisfactorily attain a well-balanced chromatic aberration correction state by the two, i.e., positive and negative lenses in the conversion lens CL, the two lenses $L_{c1}$ and $L_{c2}$ are preferably arranged in a proximity state, i.e., preferably satisfy the following condition:

$$-0.02 < d_{CL}\Phi_{CL} \leq 0 \tag{7}$$

$$(\Phi_{CL} < 0, d_{CL} \geq 0)$$

where
$d_{CL}$: the air interval along the optical axis between the positive lens $L_{c1}$ and the negative lens $L_{c2}$ in the conversion lens $\Phi_{CL}$: the refracting power of the conversion lens When the lower limit of condition (7) is exceeded, the air interval between the positive and negative lenses $L_{Cl}$ and $L_{c2}$ constituting the conversion lens CL is increased, and it is difficult to correct a chromatic aberration along the axis.

In a substantially intermediate state M and in a state at the tele end $T_1$ wherein the conversion lens CL is arranged, the spherical aberration of the zoom lens M having the two-group (positive/negative) structure and serving as the master lens is normally corrected to an aberration pattern whose peripheral portion expands in the negative direction, and whose intermediate portion expands in the positive direction. For this reason, the conversion lens CL must have an appropriate lens shape having an aberration mechanism for complimentarily correcting this aberration pattern. For this purpose, the image-side surface of the positive lens $L_{c1}$ and the object-side surface of the negative lens $L_{c2}$ in the conversion lens CL have curvatures so that their convex surfaces face the image side, thus achieving the spherical aberration correction.

When the object-side surface of the positive lens $L_{c1}$ and the image-side surface of the negative lens $L_{c2}$ in the conversion lens CL have radii of curvature having the same sign, various aberrations produced on these two surfaces cancel each other in a well-balanced state. If the radius of curvature of the object-side surface of the positive lens $L_{c1}$ in the conversion lens is represented by $R_a$, and the radius of curvature of the image-side surface of the negative lens $L_{C2}$ in the conversion lens is represented by $R_b$, they preferably satisfy:

$$-1 \leq \frac{R_a}{R_b} < 2 \tag{8}$$

where when $R_a$ is a plane, $R_a = 0$.

When the lower limit of condition (8) is exceeded, since various aberrations having the same tendency are produced to enhance each other on the two surfaces having $R_a$ and $R_b$, it is difficult for the two-lens (positive/negative) structure to correct these aberrations. When the upper limit of condition (8) is exceeded, a surface refracting power (surface power) of $R_b$ with respect to $R_a$ is increased, and various aberrations produced between these two surfaces cannot be canceled in a well-balanced state.

As described above, the conversion lens CL must be arranged behind the second group $G_2$ of the zoom lens M having the two-group (positive/negative) structure and serving as the master lens. When the conversion lens CL is arranged near an image plane separated from the second group, principal rays outside the optical axis are diverged as they propagate toward the image plane. Therefore, the lens diameter of the conversion lens is increased. For this reason, in order to make the conversion lens CL compact, as shown in FIG. 2, the conversion lens CL is effectively arranged near and immediately behind the second group $G_2$.

In particular, in order to simultaneously and reliably achieve an efficient variable power operation, good aberration correction, and a compact structure of the compound zoom lens of the present invention, the zoom lens is preferably constituted to satisfy the following conditions (9) and (10):

$$f_{MC} > \sqrt{f_W \cdot f_T} \quad (9)$$

$$0 \leq L_{CT} \leq L - L_{Min} \quad (10)$$

where $f_{MC}$ : the focal length of the zoom lens in a state wherein the conversion lens CL is to be added $f_W$ : the focal length at the wide-angle end of the zoom lens M $f_T$ : the focal length at the tele end of the zoom lens M $L_{CT}$ : the distance between the most image-side surface of the second group $G_2$ of the zoom lens M to the most object-side surface of the conversion lens CL in a state wherein the conversion lens CL is added L : the distance between the most image-side surface of the second group $G_2$ of the zoom lens M to the image plane in a state wherein the conversion lens CL is to be added $L_{Min}$ : the minimum distance between the most image-side surface of the second group $G_2$ of the zoom lens M to the image plane The above-mentioned conditions will be explained in detail below.

Condition (9) defines arrangement of the conversion lens CL in a focal length state wherein the focal length of the zoom lens M to be added with the conversion lens CL becomes larger than the focal length obtained by calculating a geometric mean of the focal length at the wide-angle end W and the focal length at the tele end $T_1$ of the zoom lens M, and is a condition for maintaining a compact shape and good focusing performance of the lens system, and for performing an efficient zooming operation. When the range of condition (9) is exceeded, the refracting power of the conversion lens CL must be increased in order to obtain a desired synthesized focal length, and it is difficult to achieve aberration correction. This undesirably results in an increase in size of the conversion lens CL.

Condition (10) defines an appropriate position to arrange the conversion lens CL so as to make the compound zoom lens compact, and is a condition for suppressing the refracting power of the conversion lens CL to be relatively low while maintaining a small diameter of the conversion lens, thereby satisfactorily performing aberration correction.

When the range of condition (10) is exceeded, in order to focus oblique rays having a relatively large field angle, the lens diameter of the conversion lens is inevitably increased, and the conversion lens CL must have a high refracting power, thus making the aberration correction difficult.

Note that the outer diameter of the conversion lens CL is preferably smaller than the maximum outer diameter of the second group $G_2$ of the master lens M (two-group (positive/negative) structure zoom lens). This is because when the outer diameter of the conversion lens CL is larger than the outer diameter of the second group $G_2$ of the master lens M, this means that the outer diameter is larger than that of the second group $G_2$ of the master lens M, whose lens outer diameter tends to be increased, and it is very difficult to incorporate the conversion lens CL in a main body of, e.g., a compact camera.

EMBODIMENTS

An embodiment of the present invention will be described in detail below. FIG. 1 shows a two-group zoom lens consisting of a first group $G_1$ having a positive refracting power, and a second group $G_2$ having a negative refracting power. This zoom lens has a first variable focal length range ($W_1$-$T_1$) of 36.0 to 78.0, and a zoom ratio of 2.17.

This zoom lens is applied to the master lenses M in the first embodiment described above, and in the second and third embodiments of the present invention (to be described later).

The positive first group $G_1$ in the master lens is constituted by a positive meniscus lens $L_1$ whose convex surface faces an object side, a double-concave negative lens $L_2$, a positive lens $L_3$ whose convex surface having a large curvature face the object side to be coupled to the lens $L_2$, a double-convex positive lens $L_4$, a negative meniscus lens $L_5$ whose convex surface faces an image side to be coupled to the lens $L_4$, and a double-convex positive lens $L_6$.

The negative second group $G_2$ in the master lens is constituted by a positive meniscus lens $L_7$ whose convex surface faces the image side, and two negative meniscus lenses $L_8$ and $L_9$ whose convex surfaces face the image side.

An aperture stop S is arranged between the negative meniscus lens $L_5$ whose convex surface faces the image side and the double-convex positive lens $L_6$ in the first lens group $G_1$.

As shown in FIG. 3, a zooming operation from the wide-angle end $W_1$ to the tele end $T_1$ as the first variable power range ($W_1$-$T_1$) of the master lens is attained by extending the two groups toward the object side while reducing a group interval between the first and second groups $G_1$ and $G_2$. The wide-angle end $W_1$, the intermediate focal length state $M_1$, and the tele end $T_1$ of the master lens M (two-group (positive/negative) structure zoom lens) in the embodiments to be described later will be respectively referred to as a first wide-angle end, a first intermediate focal length state, and a first tele end hereinafter.

The specifications of the master lens M shown in FIG. 1 are summarized in Table 1. The numbers at the left end in Table 1 represent the orders from the object side, symbol r designates the radius of curvature of the lens surface, symbol d designates a lens surface interval, and a refractive index n and an abbe number $\nu$ are values for d lines ($\lambda = 587.6$ nm).

The specifications of the embodiments to be described later are the same as those in Table 1. In particular, $L_{Min}$ in Tables 1, 5, and 6 represents the minimum distance between the most image-side surface of the second group $G_2$ of the master lens M to the image plane, $f_1$ is the focal length of the first group $G_1$, and $f_2$ is the focal length of the second group $G_2$. Symbol L in Tables 2, 3, 7, 8, and 9 represents the distance between the most image-side surface of the master lens M to the image plane in a state wherein the conversion lens CL is to be added, $f_{MC}$ is the focal length of the master lens M in a state wherein the conversion lens CL is to be added, $L_{CT}$ is the distance between the most image-side surface of the second group $G_2$ of the master lens M to the most object-side surface of the conversion lens CL in a state wherein the conversion lens CL is added, f is the synthesized focal length of the master lens M and the conversion lens CL, $f_{23}$ is the synthesized focal length of the focal length of the second group $G_2$ of the master lens M and the focal length of the conversion lens CL, and $f_{Cl}$ is the focal length of the conversion lens CL.

TABLE 1

(Master Lens M of First to Third Embodiments)

f: 36.0 to 78.0, $L_{Min}$ = 9.541
$f_1$ = 25.4185, $f_2$ = −24.4227

| | r | d | ν | n |
|---|---|---|---|---|
| 1 | 18.075 | 3.30 | 58.5 | 1.65160 |
| 2 | 29.608 | 2.20 | | |
| 3 | −25.473 | 2.00 | 45.4 | 1.79668 |
| 4 | 9.973 | 5.80 | 41.4 | 1.57501 |
| 5 | −58.411 | 0.60 | | |
| 6 | 27.978 | 4.50 | 57.0 | 1.62280 |
| 7 | −11.948 | 1.70 | 23.0 | 1.86074 |
| 9 | 162.604 | 1.20 | 32.2 | 1.67270 |
| 10 | −162.608 | (variable) | | |
| 11 | −40.229 | 2.70 | 28.6 | 1.79504 |
| 12 | −16.374 | 1.70 | | |
| 13 | −15.801 | 1.20 | 33.9 | 1.80384 |
| 14 | −37.433 | 2.30 | | |
| 15 | −14.363 | 1.30 | 45.4 | 1.79668 |
| 16 | −67.732 | (Bf) | | |

| f | 36.000 | 57.0001 | 78.0003 |
|---|---|---|---|
| d10 | 10.6254 | 4.2723 | 1.3401 |
| Bf | 9.5407 | 29.7181 | 49.8955 |

The first to third embodiments of the present invention added with the conversion lens CL will be described in detail below with reference to FIGS. 2, 4, and 5.

Figure 4:
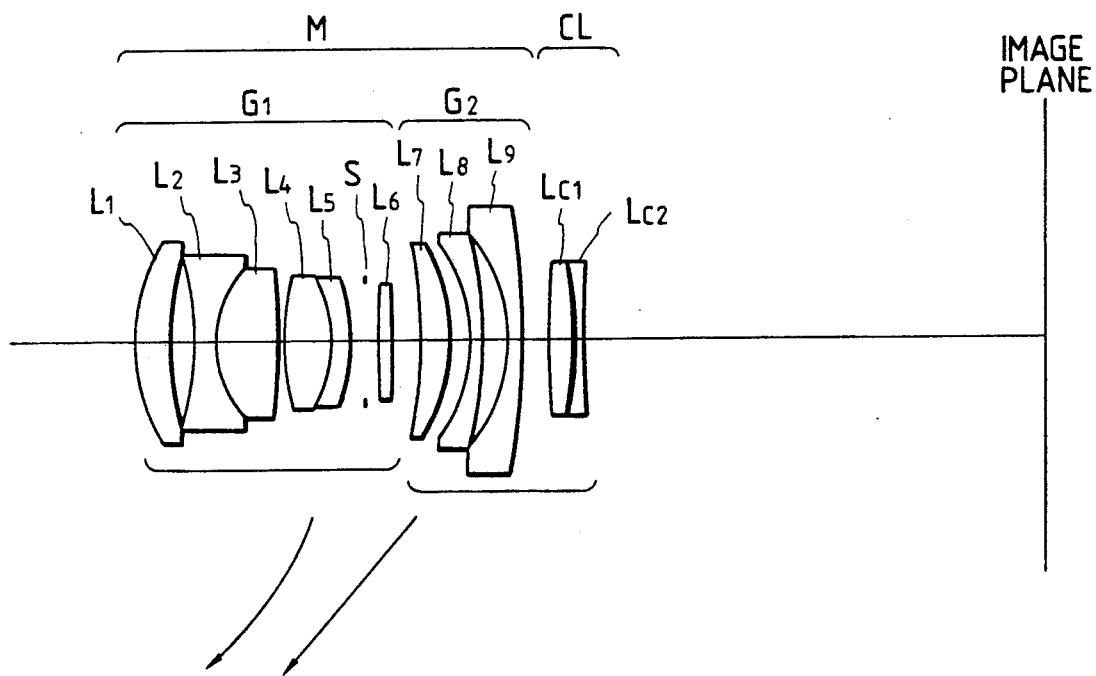
FIG. 4 is a view showing a lens structure of a compound zoom lens according to the second embodiment of the present invention.
Figure 5:
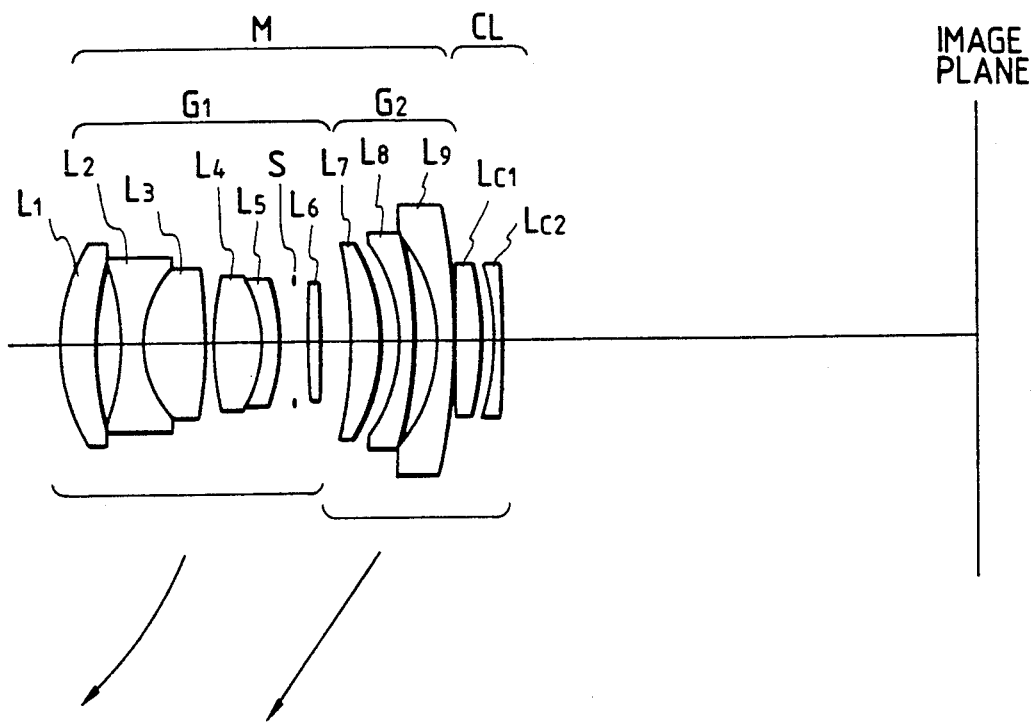
FIG. 5 is a view showing a lens structure of a compound zoom lens according to the third embodiment of the present invention.

FIGS. 2, 4, and 5 are views showing states at a second wide-angle end $W_2$ wherein the conversion lens CL is added at the image side of the master lens M (two-group (positive/negative) structure zoom lens) shown in Table 1.

In each of the first to third embodiments, the conversion lens CL is constituted by a positive lens $L_{C1}$ and a negative lens $L_{c2}$, whose surface having a large curvature faces the object side, as shown in FIGS. 2, 4, and 5.

In each of the first to third embodiments, the conversion lens CL is inserted in a region at the first tele end side of the master lens M. Upon insertion of the conversion lens CL, the master lens M is integrally extended toward the object side while the group interval is left unchanged, thereby correcting the image plane which moves upon insertion of the conversion lens CL while assuring an insertion space of the conversion lens CL.

The concrete numerical values of an extension amount δ in the respective embodiments are described in the specification tables below. More specifically, when the master lens M is moved by the extension amount δ from an in-focus position obtained when the master lens M has the focal length $f_{MC}$, and the conversion lens CL is added, a predetermined synthesized focal length f can be obtained.

In each of the embodiments, a zooming operation from the second wide-angle end $W_2$ to a second tele end $T_2$ as a second variable power range ($W_2$-$T_2$) shown in FIG. 3 is attained by extending the conversion lens CL together with the second group $G_2$ toward the object side while decreasing an air interval between the first and second groups $G_1$ and $G_2$. More specifically, when the conversion lens CL is moved together with the second group $G_2$, a zooming operation is essentially attained by a second two-group (positive/negative) structure zoom lens. As a result, a second variable focal length range of 82.0 to 102.0 mm can be obtained.

At this time, the first group $G_1$ of the master lens M, and the second group $G_2$ of the master lens M and conversion lens CL are moved along the same relative moving paths as those of the first and second groups $G_1$ and $G_2$ of the master lens M at the tele end side ($M_1$-$T_2$) in the first zooming range. Thus, a zoom cam for moving the first group $G_1$ of the zoom lens M in the second zooming range ($W_2$-$T_2$) shown in FIG. 3 (to be described later) can be commonly used as a zoom cam at the tele end side ($M_1$-$T_1$) for the first group $G_1$ of the master lens M in the first zooming range ($W_1$-$T_1$), and a zoom cam for the second group $G_2$ of the master lens M and the conversion lens CL in the second zooming range can be commonly used as a zoom cam at a tele end side ($M_1$-$T_1$) for the second group $G_2$ of the master lens M. Therefore, the lens barrel structure can be greatly simplified, and reduction of manufacturing cost can be expected.

Tables 2 to 4 below summarize specifications of the first to third embodiments in a state wherein the conversion lens CL is added to the master lens M shown in Table 1, and they are moved to the second zooming range.

TABLE 2

(First Embodiment)

f: 82.0 to 102.0, L: 38.98 to 49.01
$f_{MC}$: 66.64 to 77.08
$L_{CT}$ = 2.5, $f_{23}$ = −20.7586, $f_{CL}$ = −175.9796

| | r | d | ν | n | |
|---|---|---|---|---|---|
| 1 | 18.075 | 3.30 | 58.5 | 1.65160 | |
| 2 | 29.608 | 2.20 | | | |
| 3 | −25.473 | 2.00 | 45.4 | 1.79668 | |
| 4 | 9.973 | 5.80 | 41.4 | 1.57501 | |
| 5 | −58.411 | 0.60 | | | |
| 6 | 27.978 | 4.50 | 57.0 | 1.62280 | |
| 7 | −11.948 | 1.70 | 23.0 | 1.86074 | |
| 8 | −17.729 | 2.65 | | | |
| 9 | 162.604 | 1.20 | 32.2 | 1.67270 | M |
| 10 | −162.608 | (variable) | | | |
| 11 | −40.229 | 2.70 | 28.6 | 1.79504 | |
| 12 | −16.374 | 1.70 | | | |
| 13 | −15.801 | 1.20 | 33.9 | 1.80384 | |
| 14 | −37.433 | 2.30 | | | |
| 15 | −14.363 | 1.30 | 45.4 | 1.79668 | |
| 16 | −67.732 | 2.50 | | | |
| 17 | 147.330 | 2.00 | 35.5 | 1.59507 | |
| 18 | −39.799 | 0.30 | | | CL |
| 19 | −31.562 | 1.00 | 49.5 | 1.77279 | |
| 20 | 2041.790 | (Bf) | | | |

| f | 82.0054 | 92.0063 | 102.0060 |
|---|---|---|---|
| d10 | 2.6966 | 1.9972 | 1.4350 |
| Bf | 41.9324 | 50.0999 | 58.2664 |

Extension Amount δ of Master Lens M Upon Insertion of Cl

| Synthesized Focal Length: f | 82.0054 to 102.0060 |
|---|---|
| Focal Length of M: $f_{MC}$ | 66.6420 to 77.0814 |
| Extension Amount of M: δ | 8.7502 to 15.0537 |

TABLE 3

(Second Embodiment)

f: 82.0 to 102.0, L: 38.98 to 49.01
$f_{MC}$: 66.64 to 77.08
$L_{CT}$ = 2.5, $f_{23}$ = −20.7579, $f_{CL}$ = −175.9797

| | r | d | ν | n | |
|---|---|---|---|---|---|
| 1 | 18.075 | 3.30 | 58.5 | 1.65160 | |
| 2 | 29.608 | 2.20 | | | |
| 3 | −25.473 | 2.00 | 45.4 | 1.79668 | |
| 4 | 9.973 | 5.80 | 41.4 | 1.57501 | |
| 5 | −58.411 | 0.60 | | | |
| 6 | 27.978 | 4.50 | 57.0 | 1.62280 | |
| 7 | −11.948 | 1.70 | 23.0 | 1.86074 | |
| 8 | −17.729 | 2.65 | | | |
| 9 | 162.604 | 1.20 | 32.2 | 1.67270 | M |
| 10 | −162.608 | (variable) | | | |
| 11 | −40.229 | 2.70 | 28.6 | 1.79504 | |

TABLE 3-continued (Second Embodiment)

| | | | | |
|---|---|---|---|---|
| 12 | −16.374 | 1.70 | | |
| 13 | −15.801 | 1.20 | 33.9 | 1.80384 |
| 14 | −37.433 | 2.30 | | |
| 15 | −14.363 | 1.30 | 45.4 | 1.79668 |
| 16 | −67.732 | 2.50 | | |
| 17 | 108.170 | 2.00 | 33.7 | 1.64831 |
| 18 | −46.371 | 0.16 | | CL |
| 19 | −34.655 | 1.00 | 46.5 | 1.80411 |
| 20 | 306.987 | (Bf) | | |

| | f | 82.0016 | 92.0019 | 102.0009 |
|---|---|---|---|---|
| | d10 | 2.6966 | 1.9972 | 1.4350 |
| | Bf | 42.1113 | 50.2780 | 58.4436 |

Extension Amount δ of Master Lens M Upon Insertion of CL

| | |
|---|---|
| Synthesized Focal Length: f | 82.0016 to 102.0009 |
| Focal Length of M: $f_{MC}$ | 66.6420 to 77.0814 |
| Extension Amount of M: δ | 8.7930 to 15.0948 |

TABLE 4

(Third Embodiment)

f: 82.0 to 102.0, L: 38.09 to 47.83
$f_{MC}$: 65.72 to 75.85
$L_{CT}$ = 0.2, $f_{23}$ = −20.7586, $f_{CL}$ = −168.3171

| | r | d | ν | n | |
|---|---|---|---|---|---|
| 1 | 18.07 | 3.30 | 58.5 | 1.65160 | |
| 2 | 29.608 | 2.20 | | | |
| 3 | −25.473 | 2.00 | 45.4 | 1.79668 | |
| 4 | 9.973 | 5.80 | 41.4 | 1.57501 | |
| 5 | −58.411 | 0.60 | | | |
| 6 | 27.978 | 4.50 | 57.0 | 1.62280 | |
| 7 | −11.948 | 1.70 | 23.0 | 1.86074 | |
| 8 | −17.729 | 2.65 | | | |
| 9 | 162.604 | 1.20 | 32.2 | 1.67270 | M |
| 10 | −162.608 | (variable) | | | |
| 11 | −40.229 | 2.70 | 28.6 | 1.79504 | |
| 12 | −16.374 | 1.70 | | | |
| 13 | −15.801 | 1.20 | 33.9 | 1.80384 | |
| 14 | −37.433 | 2.30 | | | |
| 15 | −14.363 | 1.30 | 45.4 | 1.79668 | |
| 16 | −67.732 | 0.20 | | | |
| 17 | −150.505 | 2.00 | 35.5 | 1.59507 | |
| 18 | −29.802 | 1.30 | | | CL |
| 19 | −24.807 | 1.00 | 49.5 | 1.77279 | |
| 20 | −89.161 | (Bf) | | | |

| | f | 82.0046 | 92.0053 | 102.0048 |
|---|---|---|---|---|
| | d10 | 2.8278 | 2.1284 | 1.5662 |
| | Bf | 43.0289 | 51.1962 | 59.3625 |

Extension Amount δ of Master Lens M Upon Insertion of CL

| | |
|---|---|
| Synthesized Focal Length: f | 82.0046 to 102.0048 |
| Focal Length of M: $f_{MC}$ | 65.7164 to 75.8459 |
| Extension Amount of M: δ | 9.4360 to 16.0370 |

The fourth and fifth embodiments of the present invention will be described below.

Figure 6:
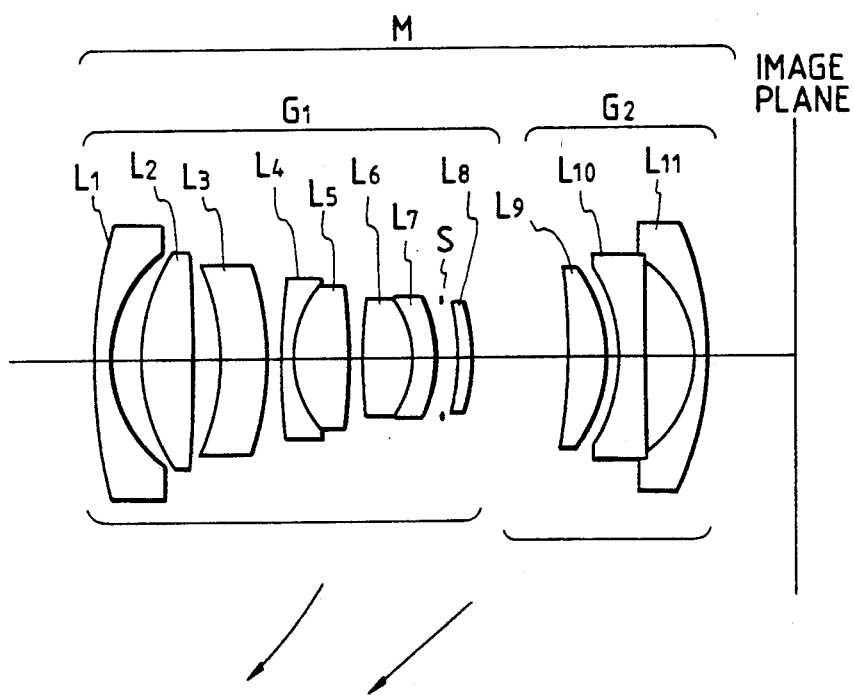
FIG. 6 is a view showing a lens structure of a zoom lens consisting of two, i.e., positive and negative lens groups, which is used as a master lens in the fourth embodiment of the present invention.
Figure 8:
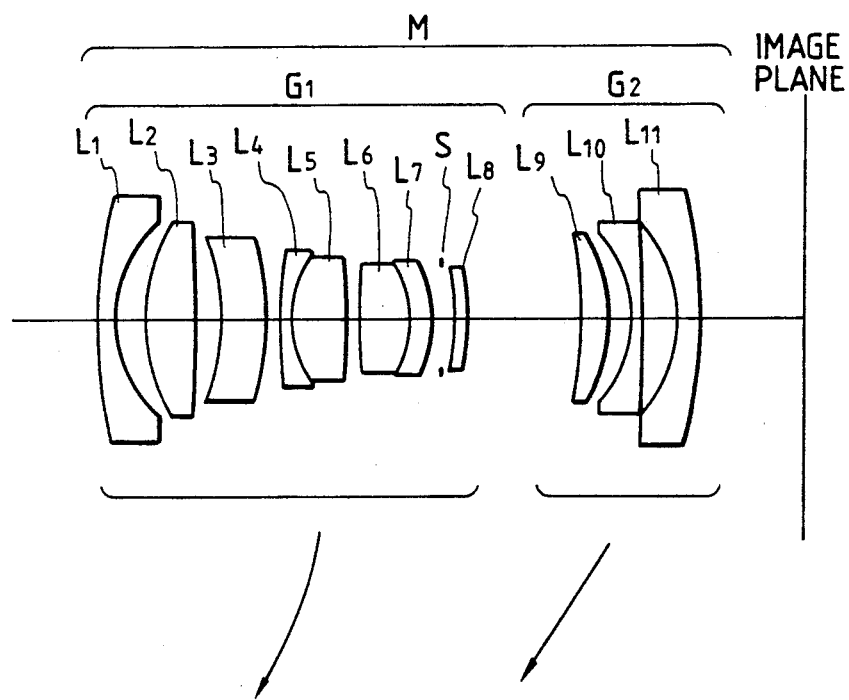
FIG. 8 is a view showing a lens structure of a zoom lens consisting of two, i.e., positive and negative lens groups, which is used as a master lens in the fifth embodiment of the present invention.

FIGS. 6 and 8 are respectively views showing lens structures of master lenses of the fourth and fifth embodiments in turn. A master lens M in each of these two embodiments is a two-group (positive/negative) zoom lens which has a wider angle than the master lenses in the first to third embodiments described above.

The master lens M of the fourth embodiment shown in FIG. 6 has a first variable focal length range of 28.5 to 68.0, and a zoom ratio of 2.39. The master lens M of the fifth embodiment shown in FIG. 8 has a first variable focal length range of 30.9 to 68.0, and a zoom ratio of 2.20.

The master lenses M of the two embodiments basically have the same lens structures except for the shape of a negative lens $L_{10}$ in a second group $G_2$. A positive first group $G_1$ in the master lens M is constituted by a negative meniscus lens $L_1$ whose convex surface faces an object side, a double-convex positive lens $L_2$, a negative meniscus lens $L_3$ whose concave surface faces the object side, a negative meniscus lens $L_4$ whose convex surface faces the object side, a positive lens $L_5$ whose stronger convex surface faces the object side to be coupled to the lens $L_4$, a positive lens $L_6$ whose stronger convex surface faces an image side, a negative meniscus lens $L_7$ whose convex surface faces the image side to be coupled to the lens $L_6$, and a positive meniscus lens $L_8$ whose convex surface faces the image side. A negative second group $G_2$ in the master lens is constituted by a positive meniscus lens $L_9$ whose convex surface faces the image side, a negative lens $L_{10}$ whose convex surface faces the image side, and a negative meniscus lens $L_{11}$ whose convex surface faces the image side. In each of the fourth and fifth embodiments, an aperture stop S is arranged between the negative meniscus lens $L_7$ whose convex surface faces the image side and the positive meniscus lens $L_8$ whose convex surface faces the image side in the first lens group.

In each of the fourth and fifth embodiments, as shown in FIG. 3, a variable power operation from a first wide-angle end $W_1$ to a first tele end $T_1$ in a first variable power range of the master lens M is attained by extending the two groups toward the object side while decreasing a group interval between the first and second groups $G_1$ and $G_2$.

Tables 5 and 6 below summarize specifications of the master lenses of the fourth and fifth embodiments shown in FIGS. 6 and 8, respectively.

TABLE 5

(Master Lens M of Fourth Embodiment)

f: 28.5 to 68.0, $L_{Min}$ = 8.1831
$f_1$ = 18.8311, $f_2$ = −19.3600

| | r | d | ν | n |
|---|---|---|---|---|
| 1 | 52.620 | 1.50 | 45.4 | 1.79668 |
| 2 | 12.324 | 2.80 | | |
| 3 | 17.714 | 4.80 | 38.9 | 1.67163 |
| 4 | −173.449 | 2.50 | | |
| 5 | −20.925 | 4.20 | 45.4 | 1.79668 |
| 6 | −27.098 | 1.30 | | |
| 7 | 59.630 | 1.00 | 40.9 | 1.79631 |
| 8 | 8.970 | 5.20 | 46.5 | 1.58267 |
| 9 | −58.411 | 1.20 | | |
| 10 | 47.490 | 4.60 | 59.0 | 1.51823 |
| 11 | −9.869 | 2.00 | 25.4 | 1.80518 |
| 12 | −13.745 | 2.18 | | |
| 13 | −21.772 | 1.20 | 59.0 | 1.51823 |
| 14 | −18.012 | (variable) | | |
| 15 | −56.933 | 3.30 | 41.5 | 1.57501 |
| 16 | −14.612 | 1.40 | | |
| 17 | −14.509 | 2.30 | 54.0 | 1.61720 |
| 18 | 2309.522 | 4.40 | | |
| 19 | −11.194 | 1.00 | 47.1 | 1.62374 |
| 20 | −36.683 | (Bf) | | |

| | f | 28.5001 | 51.8202 | 68.0004 |
|---|---|---|---|---|
| | d14 | 8.6857 | 2.9291 | 1.2551 |
| | Bf | 8.1831 | 32.1582 | 48.7929 |

TABLE 6

(Master Lens M of Fifth Embodiment)

f: 30.9 to 68.0, $L_{Min}$ = 9.5124
$f_1$ = 19.3847, $f_2$ = −19.4999

| | r | d | ν | n |
|---|---|---|---|---|
| 1 | 49.763 | 1.50 | 45.4 | 1.79668 |
| 2 | 12.223 | 2.80 | | |
| 3 | 17.804 | 4.80 | 38.2 | 1.65128 |
| 4 | −117.960 | 2.50 | | |
| 5 | −20.603 | 4.20 | 40.9 | 1.79631 |
| 6 | −26.173 | 1.30 | | |
| 7 | 52.645 | 1.00 | 40.9 | 1.79631 |

TABLE 6-continued (Master Lens M of Fifth Embodiment)

| | r | d | ν | n |
|---|---|---|---|---|
| 8 | 9.276 | 5.20 | 46.5 | 1.58267 |
| 9 | −69.394 | 1.20 | | |
| 10 | 51.684 | 4.60 | 70.4 | 1.48749 |
| 11 | −10.366 | 2.00 | 25.4 | 1.80518 |
| 12 | −13.798 | 2.01 | | |
| 13 | −35.887 | 1.20 | 70.0 | 1.51860 |
| 14 | −25.338 | 10.19 | | |
| 15 | −40.025 | 2.50 | 40.9 | 1.79631 |
| 16 | −15.070 | 1.80 | | |
| 17 | −12.815 | 1.10 | 53.9 | 1.71300 |
| 18 | −138.923 | 3.20 | | |
| 19 | −13.816 | 2.10 | 54.0 | 1.71300 |
| 20 | −49.714 | (Bf) | | |

| | | | |
|---|---|---|---|
| f | 30.9006 | 51.8216 | 68.0034 |
| d14 | 10.1919 | 5.2534 | 3.5177 |
| Bf | 9.5124 | 30.5578 | 46.8357 |

Figure 7:
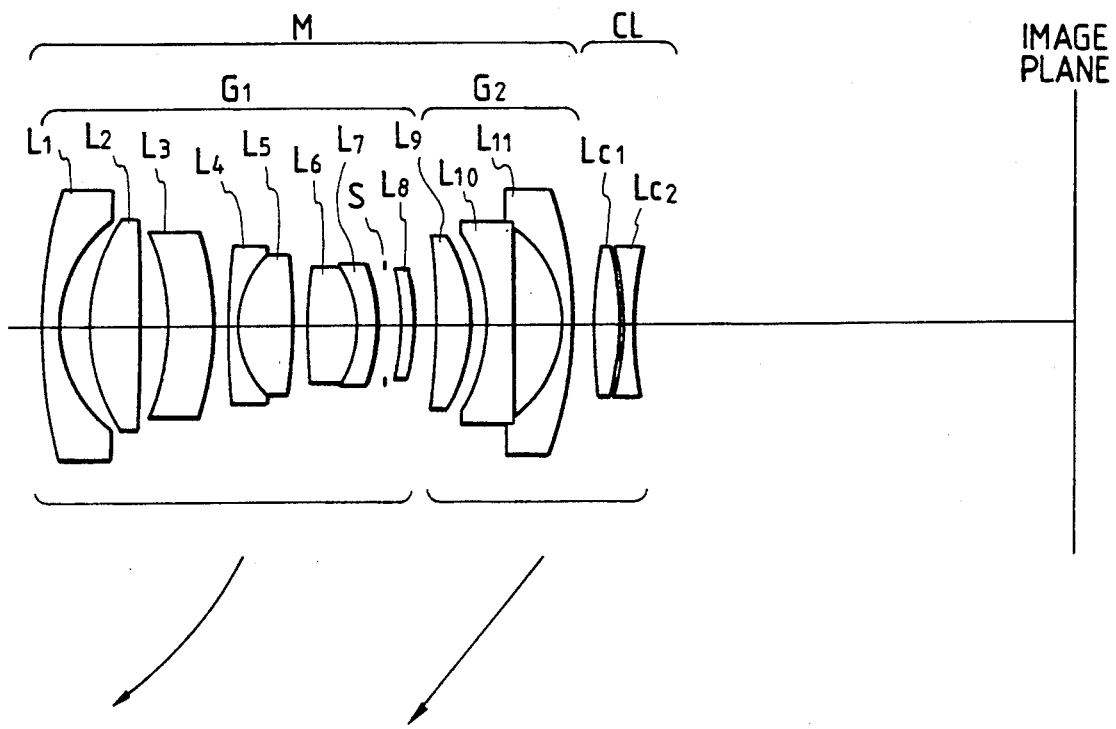
FIG. 7 is a view showing a lens structure of a compound zoom lens according to the fourth embodiment of the present invention.
Figure 9:
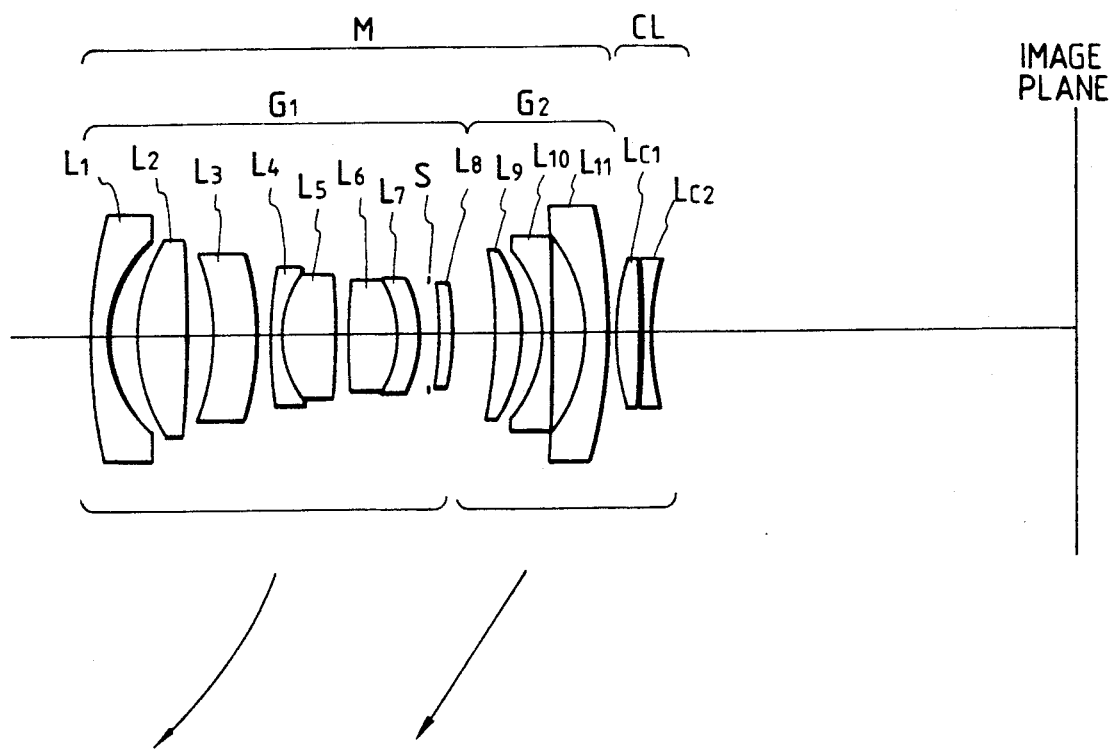
FIG. 9 is a view showing a lens structure of a compound zoom lens according to the fifth embodiment of the present invention.

The fourth and fifth embodiments will be described below with reference to FIGS. 7 and 9 showing states wherein the conversion lens CL is added to the master lenses M shown in FIGS. 6 and 8.

FIGS. 7 and 9 show states at the second wide-angle end $W_2$ wherein the conversion lens CL is added to an image side of the master lens M shown in Tables 5 and 6, respectively. In each of the fourth and fifth embodiments, the conversion lens CL consists of a double-convex positive lens $L_{C1}$ and a double-concave negative lens $L_{c1}$, as shown in FIGS. 7 and 9.

In each of the fourth and fifth embodiments, the conversion lens CL is inserted in a first tele end side region ($M_1$-$T_1$) of the master lens M. When the conversion lens CL is inserted, the master lens M is integrally extended while assuring an insertion space of the conversion lens CL, thereby correcting the image plane which is moved upon insertion of the conversion lens CL. The concrete numerical values of an extension amount δ in the fourth and fifth embodiments are shown in Tables below.

In each of the fourth and fifth embodiments, a zooming operation from the second wide-angle end $W_2$ to the second tele end $T_2$ is attained by extending the first group $G_1$ and the second group $G_2$ together with the conversion lens CL while reducing an air interval between the first and second groups $G_1$ and $G_2$.

More specifically, when the conversion lens CL is moved together with the second group $G_2$, a zooming operation as a second two-group (positive/negative) structure zoom lens can be essentially attained. As a result, a second variable focal length range of 70.0 to 90.0 can be obtained.

Figure 10:
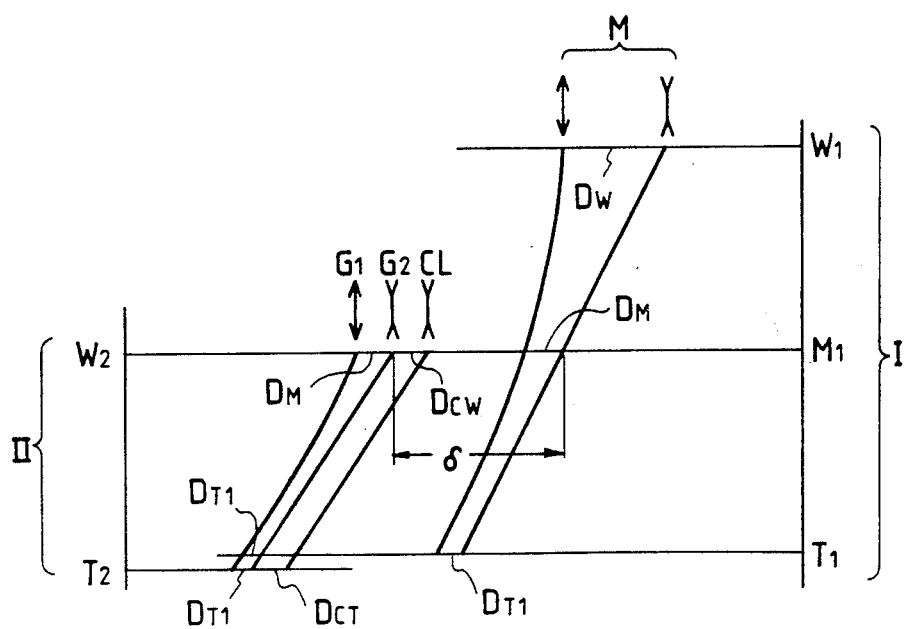
FIG. 10 is a chart for exemplifying a case wherein a moving path at a tele end in a second zooming range is longer than a moving path of the master lens at a tele end in a first zooming range in the compound zoom lenses according to the embodiments of the present invention.

At this time, the first group $G_1$ of the master lens M, and the second group $G_2$ of the master lens M and the conversion lens CL are moved to form the same relative moving paths as those formed by the first and second groups $G_1$ and $G_2$ of the master lens M in a tele end side region ($M_1$-$T_1$) in a first zooming range ($W_1$-$T_1$). However, as shown in FIG. 10, when the master lens M approaches a state at the second tele end $T_2$, a relative group interval of the master lens becomes smaller than that in a state at the first tele end $T_1$. For this reason, for example, when zoom cams for the two groups in the second zooming range and those in the first zooming range are to be partially commonly used, the grooves of the zoom cams for the two groups must be extended so as to attain a zooming operation up to the second tele end.

Tables 7 and 8 summarize specifications of the fourth and fifth embodiments in states wherein the conversion lens CL is added to the master lenses shown in Tables 5 and 6, and these master lenses are moved to the second variable focal point range.

TABLE 7

(Fourth Embodiment)

f: 70.0 to 90.0, L: 40.04 to 51.61
$f_{MC}$: 59.48 to 70.74
$L_{CT}$ = 1.8, $f_{23}$ = −16.3149, $f_{CL}$ = −181.5588

| | r | d | ν | n | |
|---|---|---|---|---|---|
| 1 | 52.620 | 1.50 | 45.4 | 1.79668 | |
| 2 | 12.324 | 2.80 | | | |
| 3 | 17.714 | 4.80 | 38.9 | 1.67163 | |
| 4 | −173.449 | 2.50 | | | |
| 5 | −20.925 | 4.20 | 45.4 | 1.79668 | |
| 6 | −27.098 | 1.30 | | | |
| 7 | 59.630 | 1.00 | 40.9 | 1.79631 | |
| 8 | 8.970 | 5.20 | 46.5 | 1.58267 | |
| 9 | −58.411 | 1.20 | | | |
| 10 | 47.490 | 4.60 | 59.0 | 1.51823 | |
| 11 | −9.869 | 2.00 | 25.4 | 1.80518 | M |
| 12 | −13.745 | 2.18 | | | |
| 13 | −21.772 | 1.20 | 59.0 | 1.51823 | |
| 14 | −18.012 | (variable) | | | |
| 15 | −56.933 | 3.30 | 41.5 | 1.57501 | |
| 16 | −14.612 | 1.40 | | | |
| 17 | −14.509 | 2.30 | 54.0 | 1.61720 | |
| 18 | 2309.522 | 4.40 | | | |
| 19 | −11.194 | 1.00 | 47.1 | 1.62374 | |
| 20 | −36.683 | 1.80 | | | |
| 21 | 36.088 | 2.50 | 40.8 | 1.58144 | |
| 22 | −25.039 | 0.30 | | | CL |
| 23 | −27.469 | 1.00 | 52.3 | 1.74810 | |
| 24 | 39.665 | (Bf) | | | |

| | | | |
|---|---|---|---|
| f | 69.9965 | 79.9971 | 89.9962 |
| d14 | 2.0227 | 1.4740 | 1.0473 |
| Bf | 40.1206 | 48.7849 | 57.4479 |

Extension Amount δ of Master Lens M Upon Insertion of CL

| | |
|---|---|
| Synthesized Focal Length: f | 69.9965 to 89.9962 |
| Focal Length of M: $f_{MC}$ | 59.4838 to 70.7423 |
| Extension Amount of M: δ | 5.6836 to 11.4362 |

TABLE 8

(Fifth Embodiment)

f: 70.0 to 90.0, L: 40.39 to 52.88
$f_{MC}$: 61.60 to 74.02
$L_{CT}$ = 1.0, $f_{23}$ = −16.7336, $f_{CL}$ = −217.1162

| | r | d | ν | n | |
|---|---|---|---|---|---|
| 1 | 49.763 | 1.50 | 45.4 | 1.79668 | |
| 2 | 12.223 | 2.80 | | | |
| 3 | 17.804 | 4.80 | 38.2 | 1.65128 | |
| 4 | −117.960 | 2.50 | | | |
| 5 | −20.603 | 4.20 | 40.9 | 1.79631 | |
| 6 | −26.173 | 1.30 | | | |
| 7 | 52.645 | 1.00 | 40.9 | 1.79631 | |
| 8 | 9.276 | 5.20 | 46.5 | 1.58267 | |
| 9 | −69.394 | 1.20 | | | |
| 10 | 51.684 | 4.60 | 70.4 | 1.48749 | |
| 11 | −10.366 | 2.00 | 25.4 | 1.80518 | M |
| 12 | −13.798 | 2.01 | | | |
| 13 | −35.887 | 1.20 | 70.0 | 1.51860 | |
| 14 | −25.338 | (variable) | | | |
| 15 | −40.025 | 2.50 | 40.9 | 1.79631 | |
| 16 | −15.070 | 1.80 | | | |
| 17 | −12.815 | 1.10 | 53.9 | 1.71300 | |
| 18 | −138.923 | 3.20 | | | |
| 19 | −13.816 | 2.10 | 54.0 | 1.71300 | |
| 20 | −49.714 | 1.00 | | | |
| 21 | 25.211 | 2.00 | 35.5 | 1.59507 | |
| 22 | −73.798 | 0.20 | | | CL |
| 23 | −128.098 | 1.00 | 39.8 | 1.86994 | |
| 24 | 28.052 | (Bf) | | | |

| | | | |
|---|---|---|---|
| f | 70.0001 | 79.9993 | 90.0011 |
| d14 | 4.0960 | 3.5168 | 3.0662 |
| d24 | 40.3052 | 48.9369 | 57.5709 |

Extension Amount δ of Master Lens M Upon Insertion of CL

TABLE 8-continued

(Fifth Embodiment)

| | |
|---|---|
| Synthesized Focal Length: f | 70.0001 to 90.0011 |
| Focal Length of M: $f_{MC}$ | 61.5953 to 74.0158 |
| Extension Amount of M: δ | 4.1134 to 8.8868 |

A hand shake phenomenon upon photographing tends to occur mainly in a tele region where an F number is increased (brightness is decreased). Thus, since the conversion lens CL of each of the first to fifth embodiments is added for a photographing operation in the tele region, the conversion lens CL is arranged to be movable in a direction perpendicular to the optical axis, thus providing an anti-vibration effect.

In this case, when the lower limit of condition (2) is exceeded, in order to obtain the anti-vibration effect by the conversion lens CL, the power of the conversion lens CL is weak, and its movement along the optical axis is too large. As a result, it is difficult to attain anti-vibration correction using a small number of lenses. When the upper limit is exceeded, however, the power of the conversion lens CL is too strong, and it is also difficult to attain anti-vibration correction using a small number of lenses.

Figure 11:
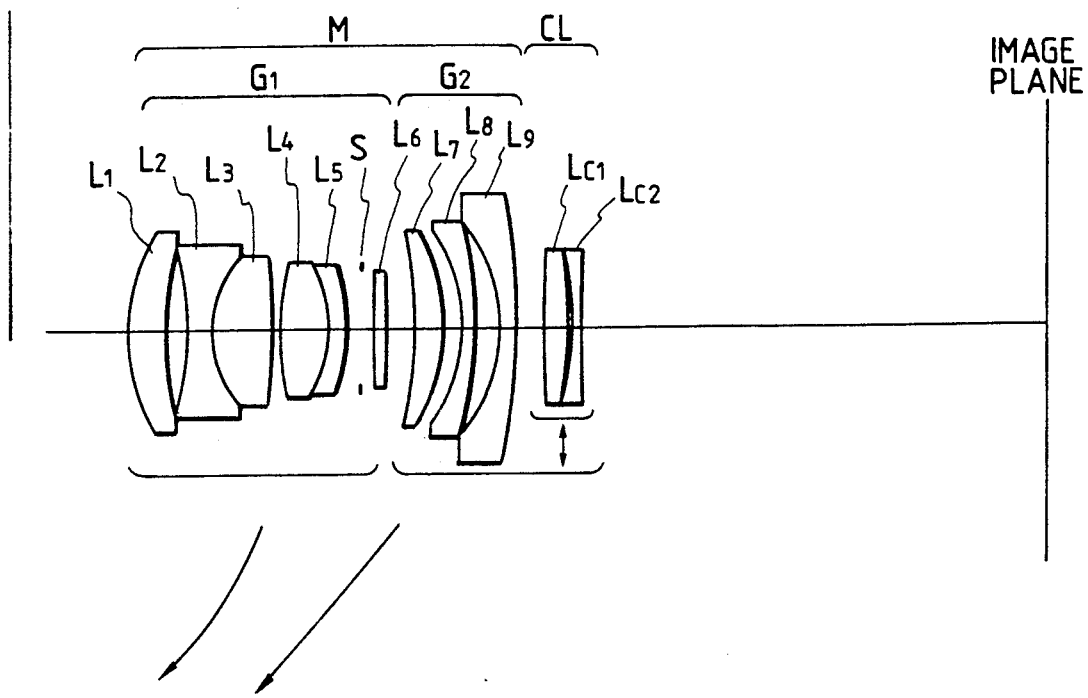
FIG. 11 is a lens chart showing a compound zoom lens according to the sixth embodiment of the present invention, in which a conversion lens has an anti-vibration function.

FIG. 11 is a view showing an anti-vibration compound zoom lens according to the sixth embodiment of the present invention in a second wide-angle end state wherein a conversion lens CL is added to an image side of a master lens M. As the master lens M, the same zoom lens as shown in FIG. 1 is adopted. Therefore, the master lens M has a first variable focal length range ($W_1$ to $W_2$) of 36.0 to 78.0, and a zoom ratio of 2.17. The conversion lens CL is constituted by, from an object side, a double-convex positive lens $L_{c1}$, and a negative lens $L_{c2}$, whose surface having a strong curvature faces the object side.

In the sixth embodiment, a zooming operation from a first wide-angle end $W_1$ to a first tele end $T_1$ in a first zooming range of the master lens M is also attained by moving the first and second groups $G_1$ and $G_2$ toward the object side while reducing a group interval between the first and second groups $G_1$ and $G_2$. When the conversion lens CL is added, the master lens M is extended toward the object side along the optical axis like in the first embodiment.

Table 9 below shows specifications in a state wherein the master lens M and the conversion lens CL of the sixth embodiment shown in FIG. 11 are moved to a second variable focal length range, and a moving amount of the conversion lens CL in a direction perpendicular to the optical axis in an anti-vibration operation.

The anti-vibration moving amount is a correction amount of the conversion lens CL when an image is moved by 0.5 mm on the image plane.

TABLE 9

(Sixth Embodiment)

f: 82.0 to 102.0, L: 38.98 to 94.01
$f_{MC}$: 66.44 to 77.08
$L_{CT}$ = 2.0, $f_{23}$ = −20.4579, $f_{CL}$ = −175.9777

| | r | d | ν | n |
|---|---|---|---|---|
| 1 | 18.075 | 3.30 | 58.5 | 1.65160 |
| 2 | 29.608 | 2.20 | | |
| 3 | −25.473 | 2.00 | 45.4 | 1.79668 |
| 4 | 9.973 | 5.80 | 41.4 | 1.57501 |
| 5 | −58.411 | 0.60 | | |
| 6 | 27.978 | 4.50 | 57.0 | 1.62280 |
| 7 | −11.948 | 1.70 | 23.0 | 1.86074 |
| 8 | −17.729 | 2.65 | | |

TABLE 9-continued

(Sixth Embodiment)

| | | | | | |
|---|---|---|---|---|---|
| 9 | 162.604 | 1.20 | 32.2 | 1.67270 | M |
| 10 | −162.608 | (variable) | | | |
| 11 | 40.229 | 2.70 | 28.6 | 1.79504 | |
| 12 | −16.374 | 1.70 | | | |
| 13 | −15.801 | 1.20 | 33.9 | 1.80384 | |
| 14 | −37.433 | 2.30 | | | |
| 15 | −14.363 | 1.30 | 45.4 | 1.79668 | |
| 16 | −67.732 | 2.50 | | | |
| 17 | 214.466 | 2.00 | 33.75 | 1.64831 | |
| 18 | −40.444 | 0.30 | | | CL |
| 19 | −31.432 | 1.00 | 46.5 | 1.80411 | |
| 20 | 1398.984 | (Bf) | | | |

| | | | |
|---|---|---|---|
| f | 82.0013 | 92.0015 | 102.0000 |
| d10 | 2.6966 | 1.9972 | 1.4350 |
| Bf | 46.2102 | 54.3773 | 62.5433 |

Extension Amount δ of Master Lens M Upon Insertion of CL

| | |
|---|---|
| Synthesized Focal Length: f | 82.0013 to 102.0000 |
| Focal Length of M: $f_{MC}$ | 66.6421 to 77.0815 |
| Extension Amount of M: δ | 8.7868 to 15.0886 |

| [Anti-vibration Moving Amount] Focal Length | 0.5 mm Correction on Image Plane Correction Amount |
|---|---|
| 82.0 | 2.15 |
| 92.0 | 1.80 |
| 102.0 | 1.55 |

Tables 10 below are condition correspondence numerical value tables of the respective embodiments according to the present invention.

TABLE 10

(Condition Correspondence Numerical Value Table: No. 1)

| Embodiment | $\frac{\phi_1}{\phi_2}$ | $\frac{\phi_1}{\phi_{23}}$ | $N_{C1}$ | $N_{C2} - N_{C1}$ |
|---|---|---|---|---|
| 1 | −0.96 | −0.82 | 1.59507 | 0.18 |
| 2 | −0.96 | −0.82 | 1.64831 | 0.16 |
| 3 | −0.96 | −0.82 | 1.59507 | 0.18 |
| 4 | −1.03 | −0.87 | 1.58144 | 0.17 |
| 5 | −1.01 | −0.86 | 1.59507 | 0.27 |
| 6 | −0.96 | −0.81 | 1.64831 | 0.16 |

(Condition Correspondence Numerical Value Table: No. 2)

| Embodiment | $ν_{C1}$ | $ν_{C2} - ν_{C1}$ | $d_{CL} \cdot \phi_{CL}$ | $\frac{R_a}{R_b}$ |
|---|---|---|---|---|
| 1 | 35.51 | 13.94 | −0.002 | 0.07 |
| 2 | 33.75 | 12.79 | −0.001 | 0.35 |
| 3 | 35.51 | 13.94 | −0.002 | 0.91 |
| 4 | 40.76 | 11.54 | −0.001 | 0.90 |
| 5 | 35.51 | 4.31 | −0.008 | 1.69 |
| 6 | 33.75 | 12.75 | −0.003 | −0.15 |

(Condition Correspondence Numerical Value Table: No. 3)

| Embodiment | $f_{MC}$ | $f_W$ | $f_T$ | $\sqrt{f_W \cdot f_T}$ |
|---|---|---|---|---|
| 1 | 66.6 to 77.1 | 36.0 | 78.0 | 52.991 |
| 2 | 66.6 to 77.1 | 36.0 | 78.0 | 52.991 |
| 3 | 65.7 to 75.8 | 36.0 | 78.0 | 52.991 |
| 4 | 59.5 to 70.7 | 28.5 | 68.0 | 44.023 |
| 5 | 61.6 to 74.0 | 30.9 | 68.0 | 45.839 |
| 6 | 66.6 to 77.1 | 36.0 | 78.0 | 52.911 |

(Condition Correspondence Numerical Value Table: No. 4)

| Embodiment | f | $L_{CT}$ | L | $L_{Min}$ | $L - L_{Min}$ |
|---|---|---|---|---|---|

TABLE 10-continued

| | | | | | |
|---|---|---|---|---|---|
| 1 | 82.0 to 102.0 | 2.5 | 39.0 to 49.0 | 9.541 | 29.5 to 39.5 |
| 2 | 82.0 to 102.0 | 2.5 | 39.0 to 49.0 | 9.541 | 29.5 to 39.5 |
| 3 | 82.0 to 102.0 | 0.2 | 38.1 to 47.8 | 9.541 | 28.6 to 38.3 |
| 4 | 70.0 to 90.0 | 1.8 | 40.0 to 51.6 | 8.183 | 31.8 to 43.4 |
| 5 | 70.0 to 90.0 | 1.0 | 40.4 to 52.9 | 9.512 | 30.9 to 43.4 |
| 6 | 82.0 to 102.0 | 2.0 | 39.0 to 49.0 | 9.541 | 29.5 to 39.5 |

Table 11 below summarizes specifications of the respective embodiments according to the present invention.

TABLE 11

| Embodiment | Variable Focal Length Region (mm) | Zoom Ratio (Z) | Total Length D (mm) | Total Length of CL | $\frac{D_{min}}{Z}$ |
|---|---|---|---|---|---|
| 1 | 36.0 to 78.0 82.0 to 102.0 | 2.83 | 53.3 to 84.4 83.6 to 98.6 | 3.3 | 18.83 |
| 2 | 36.0 to 78.0 82.0 to 102.0 | 2.83 | 53.3 to 84.4 83.6 to 98.7 | 3.2 | 18.83 |
| 3 | 36.0 to 78.0 82.0 to 102.0 | 2.83 | 53.3 to 84.4 83.5 to 98.6 | 4.3 | 18.83 |
| 4 | 28.5 to 68.0 70.0 to 90.0 | 3.16 | 63.7 to 96.9 94.6 to 111.0 | 3.8 | 20.16 |
| 5 | 30.9 to 68.0 70.0 to 90.0 | 2.91 | 64.7 to 95.4 93.6 to 109.8 | 3.2 | 22.23 |
| 6 | 36.0 to 78.0 82.0 to 102.0 | 2.83 | 53.3 to 84.4 83.6 to 98.7 | 3.5 | 18.83 |

$D_{Min}$ in Table 11 is the length when the total length of the compound zoom lens in each embodiment of the present invention becomes minimum, and $D_{Min}/Z$ is the minimum total length of the compound zoom lens normalized by a zoom ratio (zooming ratio). More specifically, as this value is smaller, a high zoom ratio and a decrease in total length of the compound zoom lens can be attained.

For the sake of comparison, a two-group (positive/negative) structure zoom lens in the first embodiment of Japanese Laid-Open Patent Application No. 1-250917 has $D_{Min}/Z$ of 24.36. Thus, the zoom lenses according to the embodiments of the present invention have considerably small values of $D_{Min}/Z$.

A four-group (positive/negative/positive/negative) structure zoom lens in Japanese Laid-Open Patent Application No. 63-43115 has $D_{Min}/Z$ of 29.38. Thus, the zoom lenses according to the embodiments of the present invention have considerably small values of $D_{Min}/Z$.

Therefore, as can be understood from the above description, the present invention can achieve a high zoom ratio and a decrease in total length of the compound zoom lens at the same time.

Note that a lens barrel structure in each embodiment of the present invention preferably has a mechanism for extending the master lens (zoom lens) M toward the object side when the conversion lens CL is inserted, and for collapsing the master lens M toward the image side when the conversion lens CL is retreated, a mechanism for allowing the detachable conversion lens CL, and a mechanism for integrally moving the second group $G_2$ of the master lens M and the conversion lens CL when the conversion lens CL is added and a zooming operation in the second variable power range is to be performed, in addition to a conventional mechanism for moving the lens groups of the master lens M to perform a zooming operation in the first variable power range.

The detailed lens barrel structure will be described below.

First, as shown in FIGS. 12 to 15, a double cam system is employed. In this system, a second cam cylinder 5 on which a guide groove 4A corresponding to a path for extending a first cam cylinder 3 is formed so as to extend the master lens M upon insertion of the conversion lens CL is arranged around (outer circumferential surface side) the first cam cylinder 3 on which two cam grooves 1 and 2 corresponding to moving paths of the first and second groups $G_1$ and $G_2$ of the master lens M in the first zooming range are formed. With this system, zooming operations in the first and second zooming ranges can commonly use the two cam grooves formed on the first cam cylinder 3.

Figure 13:
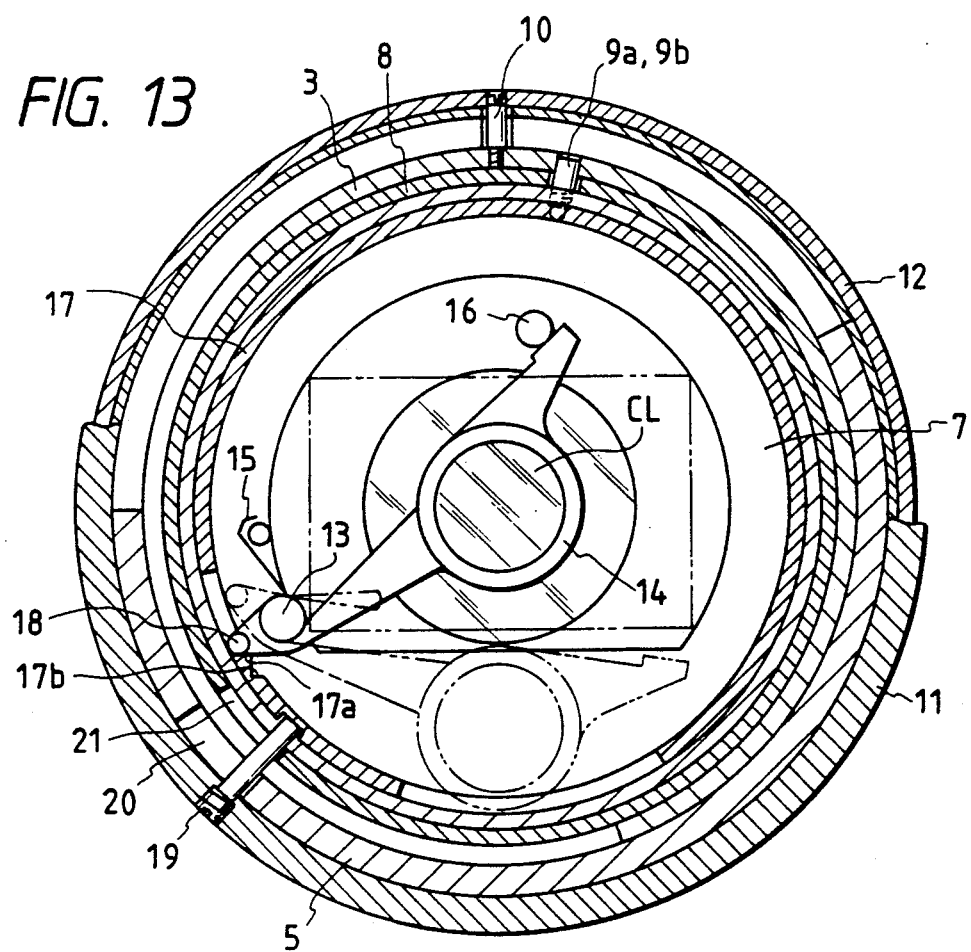
FIG. 13 is a sectional view taken along a line XIII—XIII in FIG. 12.
Figure 12:
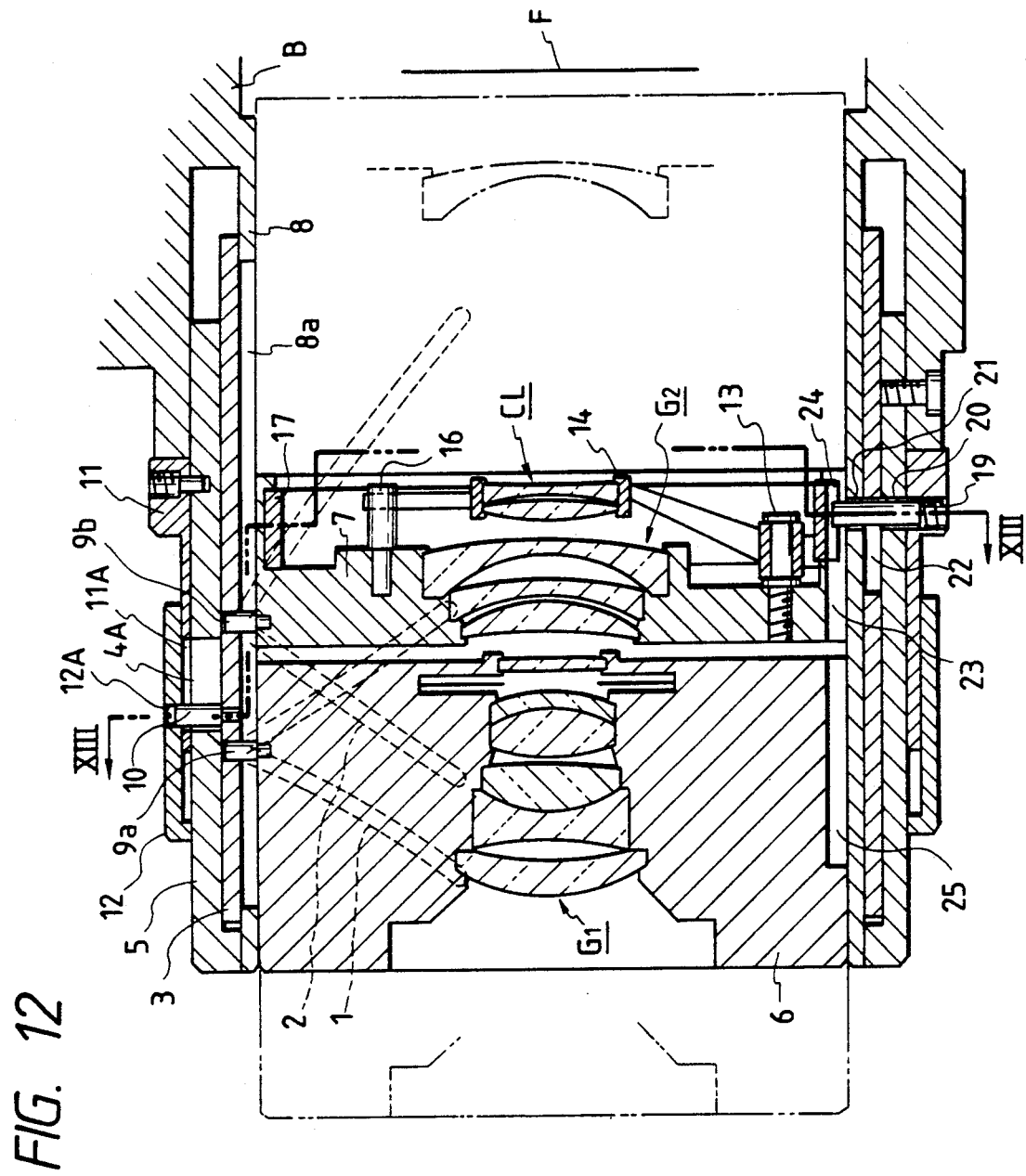
FIG. 12 is a longitudinal sectional view showing a manual lens moving device for the compound zoom lens which presents the moving paths as shown in FIG. 3.

FIG. 12 is a sectional view of a lens barrel in a state immediately after the conversion lens CL is inserted and the master lens is extended to the second zooming range, and FIG. 13 is a sectional view taken along a line XIII—XIII in FIG. 12.

In FIG. 12, symbol F designates a film surface. A first-group holding frame 6 for holding the first group $G_1$ and a second-group holding frame 7 for holding the second group $G_2$ are slidably held in a stationary inner cylinder 8 fixed to a camera main body fixing portion B. A slide pin 9a projecting from the first-group holding frame 6 extends through a straight guide groove 8a formed on the stationary inner cylinder 8, and is engaged with the first cam groove 1 of the first cam cylinder 3. A slide pin 9b projecting from the second-group holding frame 7 extends through the straight guide groove 8a formed on the stationary inner cylinder 8, and is engaged with the second cam groove 2 of the first cam cylinder 3. An engaging pin 10 projecting from the first cam cylinder 3 extends through the guide groove 4A formed on the second cam cylinder 5 fixed to the camera main body fixing portion B, and through a limit groove 11A formed on a conversion lens insertion/removal operation ring 11, and is fitted in a hole 12A of an extension operation ring 12.

The guide groove formed on the second cam cylinder 5 consists of the guide groove 4A extending parallel to the optical axis, a circumferential groove 4B crossing one end of the guide groove 4A and extending in the circumferential direction, and a cam groove 4C obliquely extending from the other end of the guide groove 4A with respect to the circumferential direction. When the extension operation ring 12 is operated to move the engaging pin 10 in the direction of the optical axis along the guide groove 4A, the first cam cylinder 3 is moved in the direction of the optical axis together with the first- and second-group holding frames 6 and 7. When the engaging pin 10 is moved along the circumferential groove 4B, the slide pins 9a and 9b are simultaneously moved in the direction of the optical axis along the cam patterns of the cam grooves 1 and 2. Thus, a zooming operation in the first zooming range can be performed. Furthermore, when the engaging pin 10 is moved along the cam groove 4C, the first cam cylinder 3 is moved in the direction of the optical axis while being rotated, thus performing a zooming operation in the second zooming range.

The conversion lens CL is held by a lens frame 14 axially supported by a pin shaft 13 projecting from the second-group holding frame 7, and is always biased counterclockwise by a torsion coil spring 15, as shown in FIG. 13. The counterclockwise rotation of the lens frame 14 about the pin shaft 13 is restricted by a restriction pin 16, so that the lens center of the conversion lens CL coincides with the optical axis of the master lens consisting of the first and second groups $G_1$ and $G_2$.

Furthermore, an engaging pin 18 which is engaged with a notched edge 17a of a pivot ring 17 rotatably held by the second-group holding frame 7 is arranged on one end of a lever portion 14A of the lens frame 14 on a side opposite to the conversion lens CL with respect to the pin shaft 13. When the pivot ring 17 is pivoted clockwise in FIG. 13, it presses the engaging pin 18 to rotate the lever portion 14A clockwise about the pin shaft 13 against the biasing force of the torsion coil spring 15, thereby causing the lens frame 14 to retreat outside a photographing optical path. In this case, the engaging pin 18 rides on the inner circumferential surface of the pivot ring 17, and is fitted in a click groove 17b formed on the inner circumferential surface. In this manner, the conversion lens CL is retreated to a predetermined position outside the photographing optical path.

On the other hand, an interlocking pin 19 for rotating the pivot ring 17 projects from the conversion lens insertion/removal operation ring 11 rotatably arranged around the second cam cylinder 5 fixed to the camera main body fixing portion B. The interlocking pin 19 extends through circumferential grooves 20 and 21 which are respectively formed on the second cam cylinder 5 and the stationary inner cylinder 8 to extend in the circumferential direction, an escape groove 22 formed on the first cam cylinder 3, and an escape groove 23 formed on the outer circumferential surface of the second-group holding frame 7 and extending in the direction of the optical axis, and is engaged with a notched groove 24 formed on the pivot groove 17 and extending in the direction of the optical axis. Thus, when the conversion lens insertion/removal operation ring 11 is rotated through a predetermined angle, the conversion lens CL can be inserted/removed in/from the optical axis via the pivot ring 17.

Figure 15:
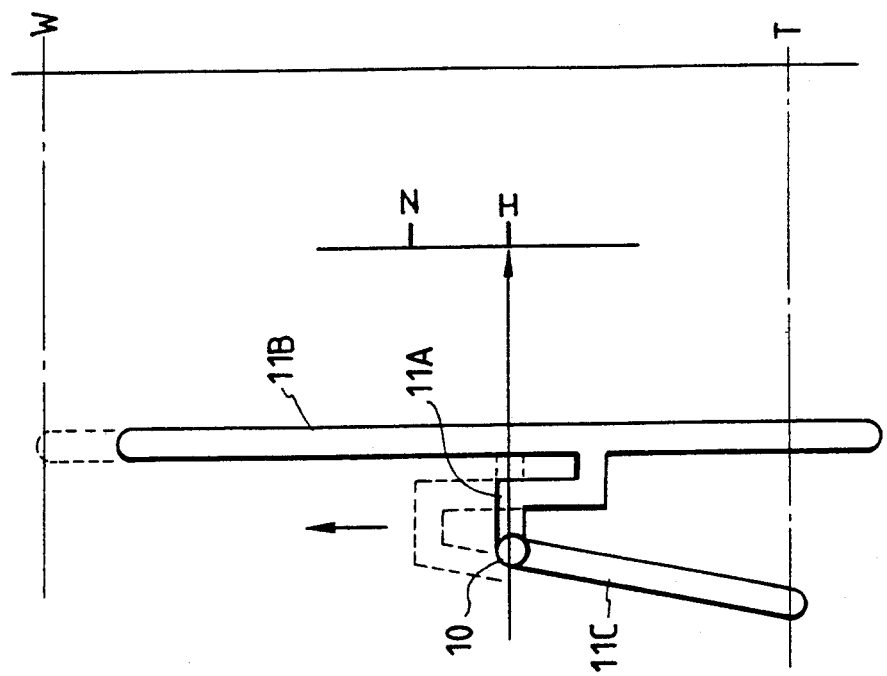
FIG. 15 is a plan view of a zooming range shift blocking device in a conversion lens insertion/removal device assembled in the lens moving device shown in FIG. 12.
Figure 14:
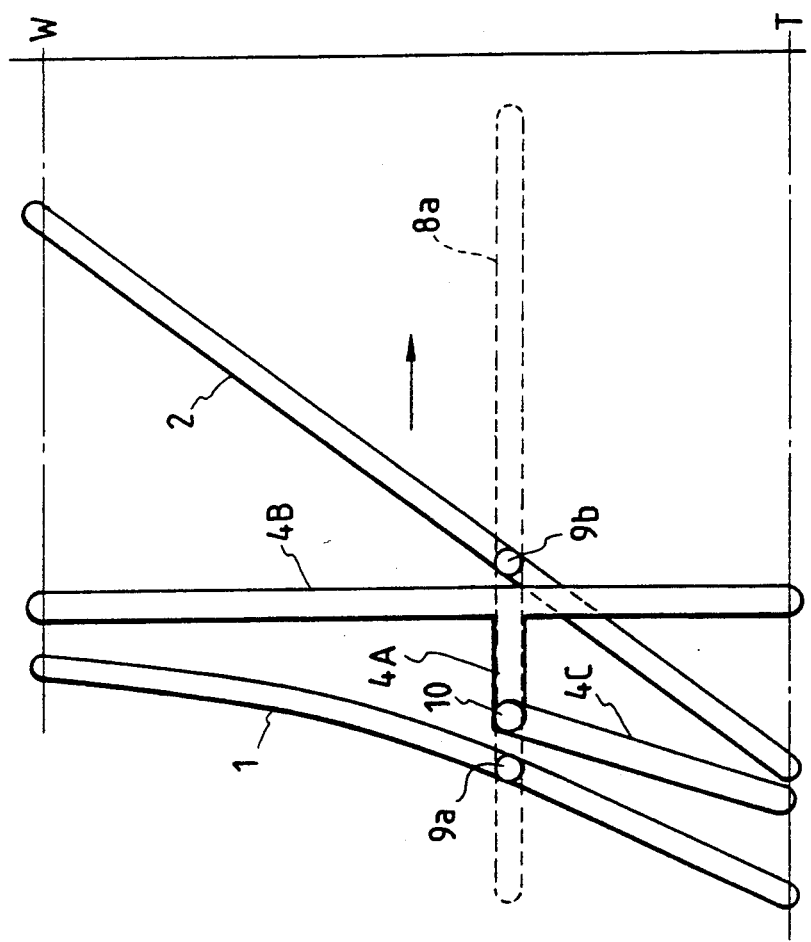
FIG. 14 is an explanatory view of a double cam system according to the present invention, which is used in a shift operation from the first zooming range to the second zooming range.

As shown in FIG. 15, a key-shaped restriction groove 11A engaged with the engaging pin 10 and crossing the guide groove 4A of the second cam cylinder 5 is formed on the conversion lens insertion/removal ring 11. Escape grooves 11B and 11C having the same patterns as the circumferential groove 4B and the cam groove 4C are formed at two ends of the restriction groove 11A to overlap the circumferential groove 4B and the cam groove 4C formed on the second cam cylinder 5. With this restriction groove 11A, the engaging pin 10 cannot pass through the guide groove 4A of the second cam cylinder 5. However, after the engaging pin 10 is moved in the direction of the optical axis, and is inserted in one end of the restriction groove 11A, the conversion lens insertion/removal operation ring 11 is rotated to move the engaging pin 10 from one end to the other end of the restriction groove 11A. Thus, the engaging pin 10 can pass through the guide groove 4A, and a zooming range can be changed. In this case, since the conversion lens CL is inserted/removed, the zooming range can be switched without causing an error.

Note that an escape groove 25 extending in the direction of the optical axis is formed on the first-group holding frame 6 like the escape groove 23 of the second-group holding frame 7. With this groove, the first and second groups $G_1$ and $G_2$ can be moved to the wide-angle end without being interfered with the interlocking pin 19.

Figure 16:
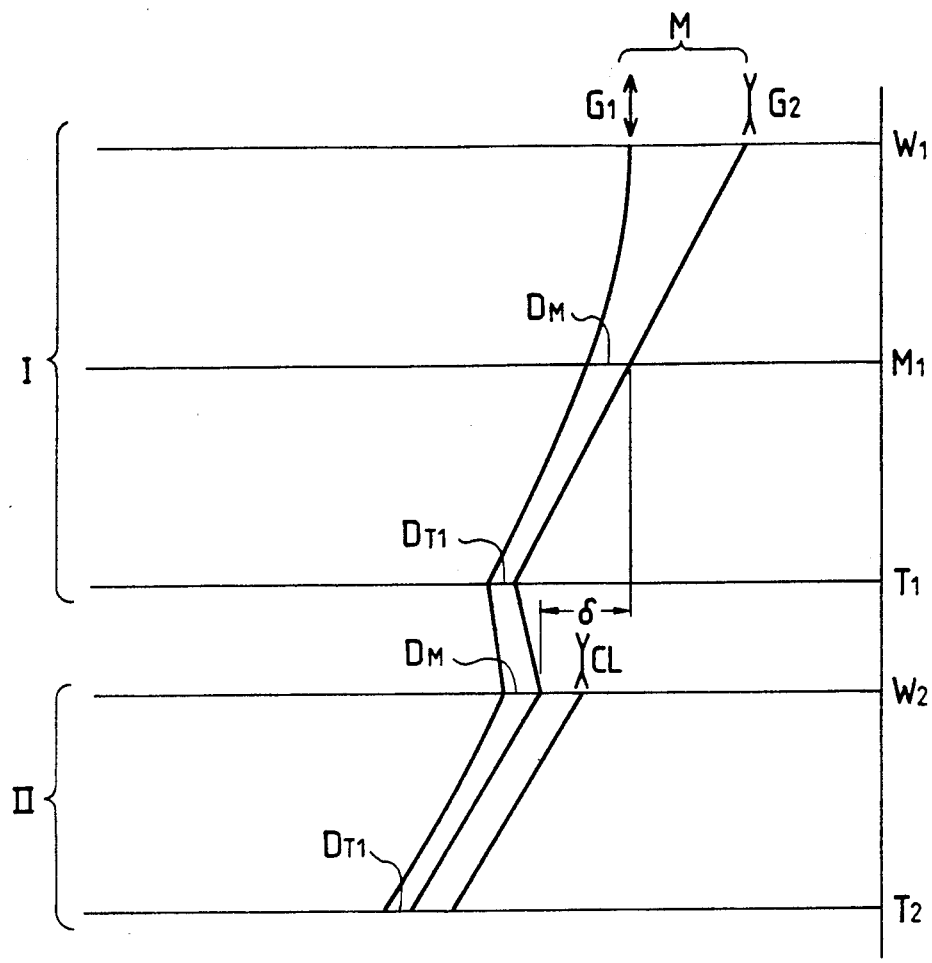
FIG. 16 is a chart for explaining lens group moving paths of a compound zoom lens which presents moving paths different from those in FIG. 3.
Figure 18:
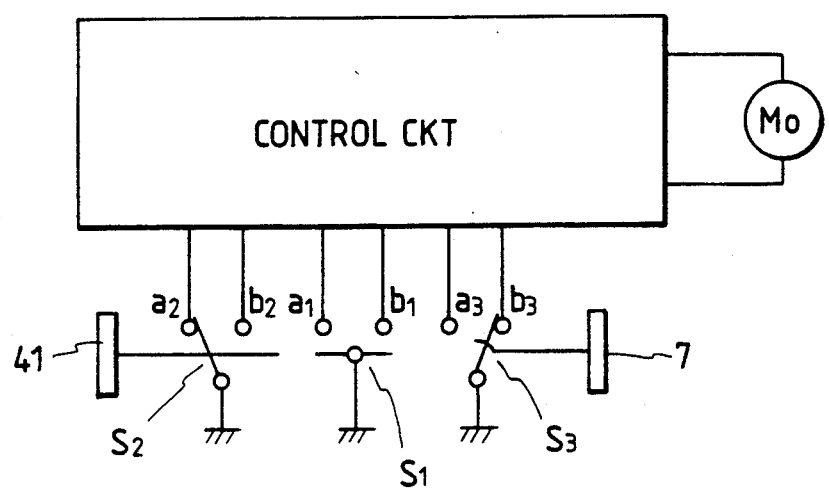
FIG. 18 is an electrical circuit diagram showing an electrical control device used in FIG. 17.
Figure 17:
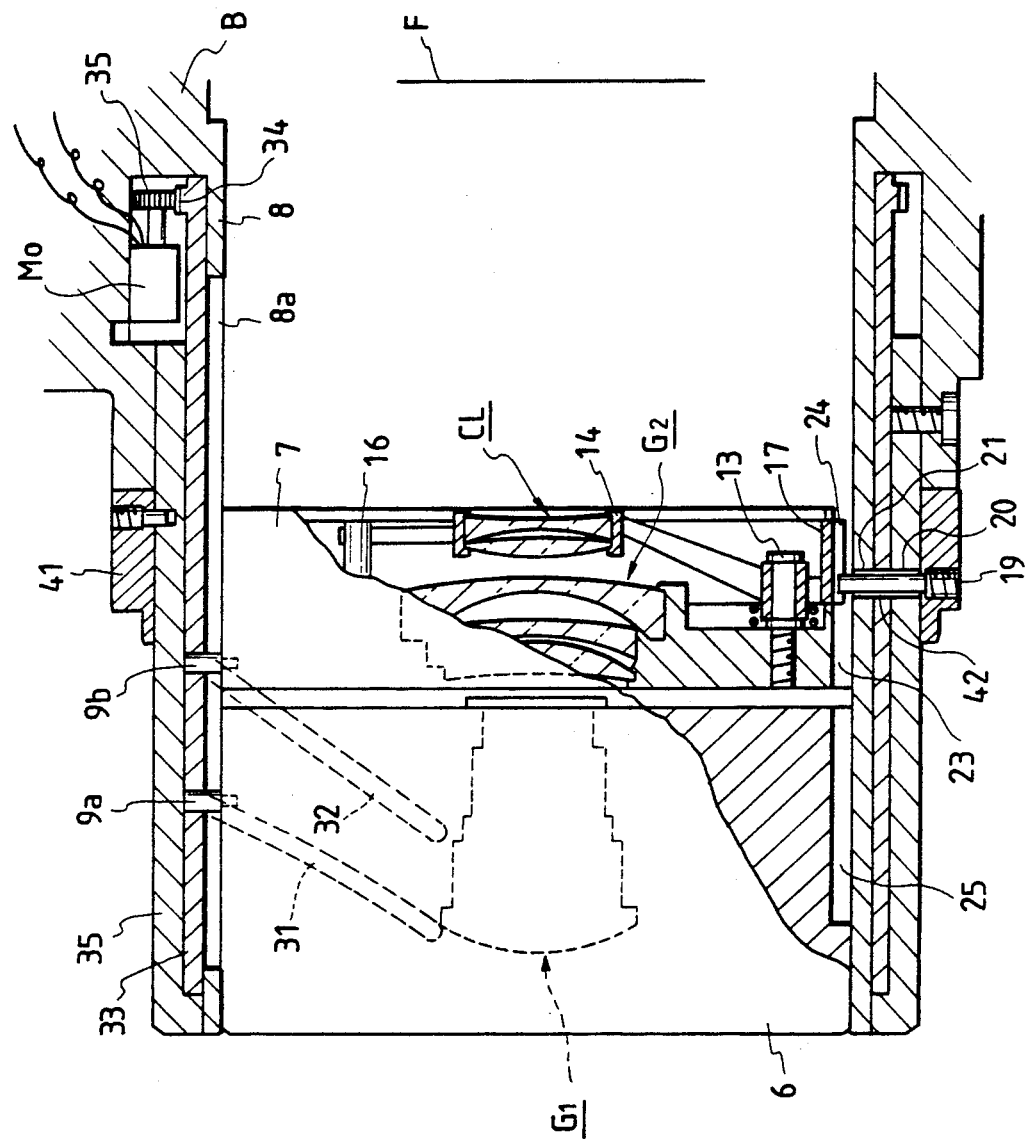
FIG. 17 is a longitudinal sectional view showing a lens moving device which motorizes rotation of a cam cylinder for moving the lens groups in the direction of the optical axis in correspondence with the lens group moving paths shown in FIG. 16.

Second, as shown in FIGS. 16 to 18, a two-stepped cam system is employed. That is, in a first cam cylinder on which two cam grooves corresponding to moving paths of the first and second groups $G_1$ and $G_2$ of the master lens M in the first zooming range are formed, two cam grooves corresponding to a moving path of the first group $G_1$ of the master lens M and a moving path of the second group $G_2$ and the conversion lens CL in the second zooming range are formed to extend longer than those in a first tele state of the first cam cylinder in consideration of an extension amount of the master lens M upon insertion of the conversion lens CL.

FIG. 16 is a chart showing moving paths of the first group $G_1$, the second group $G_2$, and the conversion lens CL, and FIG. 17 is a sectional view of a lens barrel in a state immediately after the conversion lens CL is inserted, and the master lens is shifted into the second zooming range. The same reference numerals denote portions having the same functions as those in FIGS. 3 and 12, and a detailed description thereof will be omitted.

In FIG. 17, a first-group holding frame 6 for holding the first group $G_1$ and a second-group holding frame 7 for holding the second group $G_2$ are slidably held in a stationary inner cylinder 8 fixed to a camera main body fixing portion B. A slide pin 9a projecting from the first-group holding frame 6 extends through a straight guide groove 8a formed on the first-group holding frame 6, and is engaged with a first cam groove 31 formed on a cam cylinder 33, and having a pattern corresponding to the moving path of the first group $G_1$ (FIG. 16). A slide pin 9b projecting from the second-group holding frame 7 extends through the straight guide groove 8a formed on the stationary inner cylinder 8, and is engaged with a second cam groove 32 formed on the cam cylinder 33 and having a pattern corresponding to the moving path of the second group $G_2$ (FIG. 16). A gear 34 is arranged at one end of the cam cylinder 33, and is meshed with a gear 35 which is driven by a reversible motor $M_0$ fixed on the camera main body fixing portion B.

Therefore, when the reversible motor $M_0$ is driven to rotate the cam cylinder 33, the slide pins 9a and 9b are simultaneously moved in the direction of the optical axis along the cam patterns of the cam grooves 31 and 32. Thus, zooming operations in first and second zooming ranges I and II are performed.

The conversion lens CL is held by a lens frame 14 axially supported by a pin shaft 13 projecting from the second-group holding frame 7, and is always biased counterclockwise by a torsion coil spring 15, as shown in FIG. 13. The counterclockwise rotation of the lens frame 14 about the pin shaft 13 is restricted by a restriction pin 16, so that the lens center of the conversion lens CL coincides with the optical axis of the master lens consisting of the first and second groups $G_1$ and $G_2$.

When a pivot ring 17 rotatably held by the second-group holding frame 7 is pivoted clockwise in FIG. 13, the lens frame 14 is retreated outside the photographing optical path. Thus, the conversion lens CL is retreated to a predetermined position outside the photographing optical path.

An interlocking pin 19 for rotating the pivot ring 17 projects from a conversion lens insertion/removal operation ring 41 rotatably arranged around a stationary outer cylinder 35 fixed to the camera main body fixing portion B. The interlocking pin 19 extends through circumferential grooves 20 and 21 which are respectively formed on the stationary outer cylinder 35 and the stationary inner cylinder 8 to extend in the circumferential direction, an escape groove 42 formed on the cam cylinder 33, and an escape groove 23 formed on the outer circumferential surface of the second-group holding frame 7 and extending in the direction of the optical axis, and is engaged with a notched groove 24 formed on the pivot groove 17 and extending in the direction of the optical axis. Thus, when the conversion lens insertion/removal operation ring 41 is rotated through a predetermined angle, the conversion lens CL can be inserted/removed in/from the optical axis via the pivot ring 17.

Note that an escape groove 25 extending in the direction of the optical axis is formed on the first-group holding frame 6 like the escape groove 23 of the second-group holding frame 7. With this groove, the first and second groups $G_1$ and $G_2$ can be moved to the wide-angle end without being interfered with the interlocking pin 19.

FIG. 18 is a block diagram for controlling the reversible motor $M_0$ for the zooming operations. Drive control and stop control of the reversible motor $M_0$ for the zooming operations in the first and second zooming ranges I and II are performed by a seesaw switch $S_1$. When the seesaw switch $S_1$ is connected to a terminal $a_1$, the motor $M_0$ is rotated in the forward direction, and moves the lens to a wide end $W_1$, a tele end $T_1$, a wide end $W_2$, and a tele end $T_2$ in turn. When the seesaw switch $S_1$ is connected to a terminal $b_1$, the motor $M_0$ is rotated in the reverse direction, and moves the lens to the tele end $T_2$, the wide end $W_2$, the tele end $T_1$, and the wide end $W_1$ in turn. When an operator releases his or her finger from the seesaw switch $S_1$, the motor $M_0$ is stopped at that position.

Switches $S_2$ and $S_3$ are operated to be interlocked with the conversion lens insertion/removal operation ring 41. In a state wherein the lens falls within the first zooming range I and the conversion lens CL is retreated from the optical axis, the switch $S_2$ is connected to a terminal $a_2$. When the motor $M_0$ is rotated in the forward direction, and the lens reaches the tele end $T_1$, the switch $S_3$ is switched from a terminal $B_3$ to a terminal $a_3$, and the motor $M_0$ is temporarily stopped. When the conversion lens insertion/removal operation ring 41 is rotated to insert the conversion lens CL on the optical axis, the switch $S_2$ is connected to a terminal $b_2$, and the motor $M_0$ is rotated in the forward direction. Thus, the lens reaches the wide end $W_2$ in the second zooming range II, and then moves to the tele end $T_2$.

In a state wherein the lens falls within the second zooming range II and the conversion lens CL is inserted on the optical axis, when the motor $M_0$ is rotated in the reverse direction, the lens reaches the tele end $T_1$ of the first zooming range I beyond the wide end $W_2$ of the second zooming range II. Thus, the switch $S_3$ is switched from the terminal $a_3$ to the terminal $b_3$, and the motor $M_0$ is temporarily stopped. When the conversion lens insertion/removal operation ring 41 is rotated to retreat the conversion lens CL from the optical axis, the switch $S_2$ is switched from the terminal $b_2$ to the terminal $a_2$. When the motor $M_0$ is rotated in the reverse direction again in this state, the lens can be moved from the tele end $T_1$ to the wide end $W_1$ of the first zooming range I.

Figure 19:
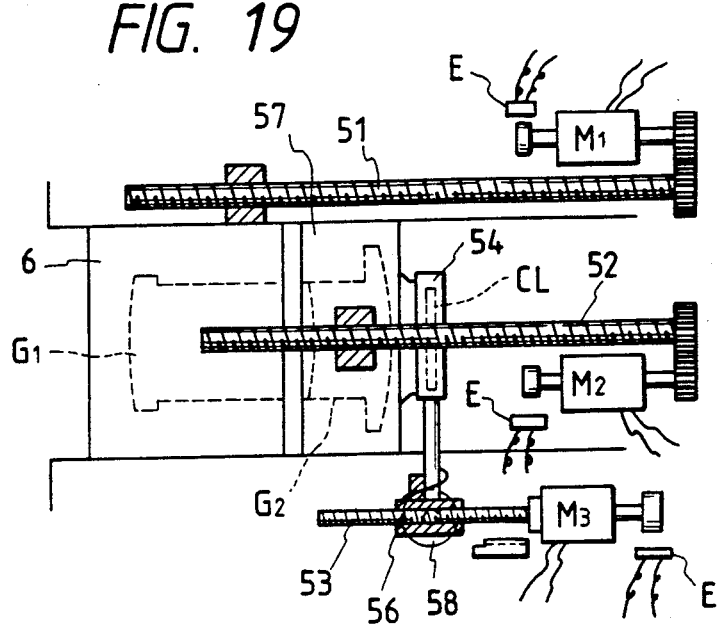
FIG. 19 is a schematic view of a lens moving device in which lens groups are independently and electrically moved.

Third, another system may be employed. In this system, the first and second groups $G_1$ and $G_2$ of the master lens M, and the conversion lens CL are independently driven by motors $M_1$, $M_2$, and $M_3$, as shown in FIG. 19, movement data of the first and second groups $G_1$ and $G_2$, and the conversion lens CL before and after insertion of the conversion lens CL are measured using an encoder and are stored in a memory unit, and the movement of the lenses is electrically controlled by a control unit such as a CPU on the basis of the memory data.

Figure 20:
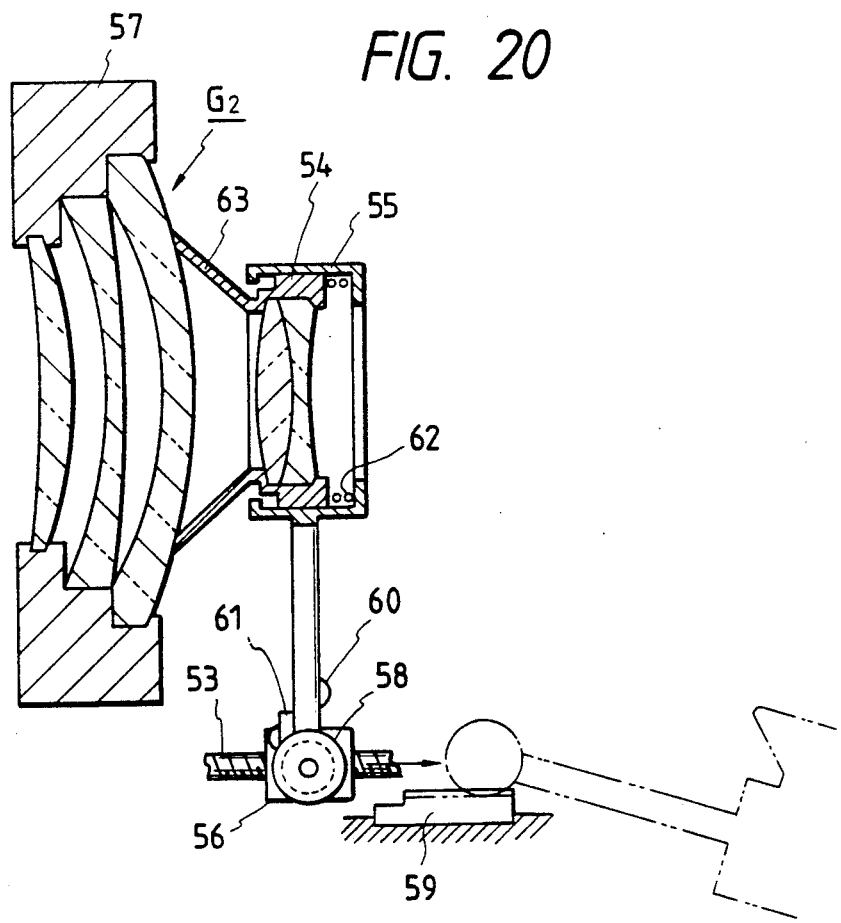
FIG. 20 is a view showing an arrangement of the conversion lens insertion/removal device shown in FIG. 19.

The motor $M_1$ moves a first-group holding frame 6 for holding the first group $G_1$ via a feed screw 51, and the motor $M_2$ moves a second-group holding frame 57 for holding the second group $G_1$ via a feed screw 52. The motor $M_3$ moves a lens insertion/removal frame 55 for slidably supporting a lens frame 54 for holding the conversion lens CL, as shown in FIG. 20, via a feed screw 53. In this case, a feed nut 56 which is threadably engaged with the feed screw 53 and rotatably supports the lens insertion/removal frame 55 in a plane including the optical axis is arranged outside a path of the second-group holding frame 57. A small gear 58 is fixed to a rotary support portion of the lens insertion/removal frame 55. When the feed nut 56 is fed to a predetermined position, the small gear 58 is meshed with a stationary rack 59, and is rotated clockwise in FIG. 20 against the biasing force of a torsion coil spring 60, thereby retreating the lens insertion/removal frame 55. When the lens insertion/removal frame 55 is retreated to a predetermined position outside a photographing optical path together with the conversion lens CL, the second-group holding frame 57 can be moved to a wide end $W_1$ of a first zooming range I beyond the retreat position.

When the master lens M is moved to a predetermined position to shift to a second zooming range II, the motor $M_3$ is driven to move the feed nut 56 forward. Thus, the small gear 58 is rotated counterclockwise while being meshed with the stationary rack 59, is separated from the rack 59, stands up by the biasing force of the torsion coil spring 60, and then abuts against a restriction pin 61 projecting from the feed nut 56. In this state, the lens insertion/removal frame 55 is collapsed to a position near the second group $G_2$ together with the feed nut 56.

In a lens frame storage portion of the lens insertion/removal frame 55, a compression coil spring 62 for biasing the lens frame 54 in the direction of the optical axis is arranged. In addition, an interval cylinder 63 having a rectangular section extending in a direction of the long side of a film window of a camera projects from the front portion of the lens frame 54. When the front edge of the interval cylinder 63 abuts against the lens surface of the second group $G_2$, as shown in FIG. 20, a predetermined interval between the second group $G_2$ and the conversion lens CL can be precisely maintained.

In the electrical control system, encoders or the like for detecting the positions of the first and second groups $G_1$ and $G_2$, and the conversion lens CL, and for detecting a rotational amount of the cam cylinder 33 in FIG. 17 may be arranged.

A focusing operation of the compound zoom lens according to the present invention is achieved by integrally extending a lens group on the object side from the aperture stop S toward the object side. More specifically, in the lens of each of the first to third embodiments, a focusing operation can be achieved by integrally extending the lenses $L_1$ to $L_5$ in FIG. 1 toward the object side in both the first and second zooming ranges. In each of the fourth and fifth embodiments, a focusing operation can be achieved by integrally extending the lenses $L_1$ to $L_7$ in FIGS. 6 and 8 toward the object side in both the first and second zooming ranges. Note that the focusing operations are not limited to those described above, as a matter of course.

A zooming system upon insertion of the conversion lens CL is not limited to the embodiments. For example, the master lens M may be defined as a front group, the conversion lens CL may be defined as a rear group, and an interval between the two groups may be changed.

Furthermore, the first and second groups $G_1$ and $G_2$ in the master lens, and the conversion lens CL may be independently moved to essentially constitute a three-group zoom lens.

As shown in FIG. 11, the conversion lens CL may be moved in a direction perpendicular to the optical axis to provide an anti-vibration effect.

In each of the embodiments of the present invention described above, the first and second zooming ranges can be continuously subjected to a zooming operations, but may be discretely (discontinuously) subjected to a zooming operation. More specifically, the first embodiment shown in FIGS. 1 and 2 will be exemplified below. For example, a discrete (discontinuous) zooming operation may be attained in multi-focal length states of 36.0, 57.0, and 78.0 in the first zooming range and of 82.0, 92.0, and 102.0 in the second zooming range.

According to the embodiments of the present invention, as can be seen from Table 11, a compound zoom lens having excellent focusing performance over the entire zooming photographing region can be realized although it has a compact structure and a remarkably wide zooming photographing region.

Thus, since the storage space of the conversion lens can be minimized, the zoom lens can be stored in a body of, e.g., a compact camera.

What is claimed is:

1. A compound zoom lens optical system capable of varying a zooming range, including
    a variable focal length photographing lens consisting of a first lens group having a positive refracting power, and a second lens group having a negative refracting power from an object side in turn; and
    a conversion lens separably added to an image side of said variable focal length photographing lens, and simultaneously movable along an optical axis to be interlocked with at least one of said first and second lens groups of said variable focal length photographing lens so as to change a synthesized focal length with said variable focal length photographing lens, and
    wherein said variable focal length photographing lens and said conversion lens satisfy the following conditions:

$$-1.5 < \Phi_1/\Phi_2 < -0.8$$

$$-1.1 < \Phi_1/\Phi_{23} < -0.2$$

where $\Phi_1$ is the refracting power of said first lens group, $\Phi_2$ is the refracting power of said second lens group, and $\Phi_{23}$ is a synthesized refracting power of said second lens group and said conversion lens.

2. An optical system according to claim 1, wherein each of said first and second lens groups, and said conversion lens includes at least one positive lens, and at least one negative lens.

3. An optical system according to claim 1, wherein said conversion lens comprises a positive lens and a negative lens from the object side in turn, and satisfies the following conditions:

$$N_{c1} < 1.7$$

$$N_{c2} - N_{c1} > 0.1$$

where $N_{c1}$ is the refractive index of said positive lens in said conversion lens with respect to d lines, and $N_{c2}$ is the refractive index of said negative lens in said conversion lens with respect to the d lines.

4. An optical system according to claim 3, wherein said conversion lens further satisfies the following conditions:

$$\nu_{c1} < 45$$

$$\nu_{c2} - \nu_{c1} > 4.0$$

where $\nu_{c1}$ is the Abbe number of said positive lens in said conversion lens, and $\nu_{c2}$ is the Abbe number of said negative lens in said conversion lens.

5. An optical system according to claim 3, wherein said conversion lens further satisfies the following condition:

$$-0.02 < d_{CL} \cdot \Phi_{CL} \leq 0$$

$$(\Phi_{CL} < 0, d_{CL} \geq 0)$$

where $\Phi_{CL}$ is the refracting power of said conversion lens, and $d_{CL}$ is the air interval along the optical axis between said positive and negative lenses in said conversion lens.

6. An optical system according to claim 1, wherein said conversion lens comprises a positive lens and a negative lens from the object side in turn, and satisfies the following condition:

$$-1 \leq R_a/R_b < 2$$

where $R_a$ is the radius of curvature of an object-side surface of said positive lens in said conversion lens, and $R_b$ is the radius of curvature of an image-side surface of said negative lens in said conversion lens.

7. An optical system according to claim 1, wherein said conversion lens is arranged near and immediately after said second lens group in said variable focal length photographing lens, and said variable focal length photographing lens and said conversion lens further satisfy:

$$f_{MC} > \sqrt{f_W \cdot f_T}$$

$$0 \leq L_{CT} \leq L - L_{Min}$$

where
  $f_{MC}$ : the focal length of said variable focal length photographing lens in a state wherein said conversion lens is to be added;
  $f_W$ : the focal length at a wide-angle end of said variable focal length photographing lens;
  $f_T$ : the focal length at a tele end of said variable focal length photographing lens;

$L_{CT}$: the distance between a most image-side surface of said second lens group of said variable focal length photographing lens to a most object-side surface of said conversion lens in a state wherein said conversion lens is to be added;

L : the distance between a most image-side surface of said second lens group of said variable focal length photographing lens to an image plane in a state wherein said conversion lens is to be added; and $L_{Min}$ : the distance in a state wherein a distance between the most image-side surface of said second lens group of said variable focal length photographing lens to the image plane becomes minimum.

8. An optical system according to claim 1, wherein said conversion lens is movable to cross the optical path, and has an anti-vibration function.

9. An optical system of claim 1, constituted according to data in the following table:

| f: 82.0 to 102.0, L: 38.98 to 49.01 $f_{MC}$: 66.64 to 77.08 $L_{CT}$ = 2.5, $f_{23}$ = −20.7586, $f_{CL}$ = −175.9796 | | | | |
|---|---|---|---|---|
| | r | d | v | n |
| 1 | 18.075 | 3.30 | 58.5 | 1.65160 |
| 2 | 29.608 | 2.20 | | |
| 3 | −25.473 | 2.00 | 45.4 | 1.79668 |
| 4 | 9.973 | 5.80 | 41.4 | 1.57501 |
| 5 | −58.411 | 0.60 | | |
| 6 | 27.978 | 4.50 | 57.0 | 1.62280 |
| 7 | −11.948 | 1.70 | 23.0 | 1.86074 |
| 8 | −17.729 | 2.65 | | |
| 9 | 162.604 | 1.20 | 32.2 | 1.67270 M |
| 10 | −162.608 | (variable) | | |
| 11 | −40.229 | 2.70 | 28.6 | 1.79504 |
| 12 | −16.374 | 1.70 | | |
| 13 | −15.801 | 1.20 | 33.9 | 1.80384 |
| 14 | −37.433 | 2.30 | | |
| 15 | −14.363 | 1.30 | 45.4 | 1.79668 |
| 16 | −67.732 | 2.50 | | |
| 17 | 147.330 | 2.00 | 35.5 | 1.59507 |
| 18 | −39.799 | 0.30 | | CL |
| 19 | −31.562 | 1.00 | 49.5 | 1.77279 |
| 20 | 2041 | 790 | (Bf) | |
| f | 82.0054 | 92.0063 | 102.0060 | |
| d10 | 2.6966 | 1.9972 | 1.4350 | |
| Bf | 41.9324 | 50.0999 | 58.2664 | |
| Extension Amount δ of Master Lens M Upon Insertion of CL | | | | |
| Synthesized Focal Length: f | 82.0054 to 102.0060 | | | |
| Focal Length of M: $f_{MC}$ | 66.6420 to 77.0814 | | | |
| Extension Amount of M: δ | 8.7502 to 15.0537 | | | | where the variable focal length photographing lens serves as a master lens (M) for the conversion lens (CL), f is the synthesized focal length of the master lens M and the conversion lens CL, L represents the distance between the most image-side surface of the master lens M to the image plane in a state wherein the conversion lens CL is to be added, $f_{MC}$ is the focal length of the master lens M in a state where the conversion lens CL is to be added, $L_{CT}$ is the distance between the most image-side surface of the second lens group of the master lens M to the most object-side surface of the conversion lens CL in a state wherein the conversion lens CL is added, $f_{23}$ is the synthesized focal length of the focal length of the second group of the master lens M and the focal length of the conversion lens CL, $f_{CL}$ is the focal length of the conversion lens CL, the numbers at the left side of the table represent the orders from the object side, r designates the radius of curvature of a lens surface, d designates a lens surface interval, v represents the Abbe number and n represents the refractive index for d line (λ=587.6 nm), Bf represents the back focal length.

10. An optical system of claim 1, constituted according to data in the following table:

| f: 82.0 to 102.0, L: 38.98 to 49.01 $f_{MC}$: 66.64 to 77.08 $L_{CT}$ = 2.5, $f_{23}$ = −20.7579, $f_{CL}$ = −175.9797 | | | | |
|---|---|---|---|---|
| | r | d | v | n |
| 1 | 18.07 | 3.30 | 58.5 | 1.65160 |
| 2 | 29.608 | 2.20 | | |
| 3 | −25.473 | 2.00 | 45.4 | 1.79668 |
| 4 | 9.973 | 5.80 | 41.4 | 1.57501 |
| 5 | −58.411 | 0.60 | | |
| 6 | 27.978 | 4.50 | 57.0 | 1.62280 |
| 7 | −11.948 | 1.70 | 23.0 | 1.86074 |
| 8 | −17.729 | 2.65 | | |
| 9 | 162.604 | 1.20 | 32.2 | 1.67270 M |
| 10 | −162.608 | (variable) | | |
| 11 | −40.229 | 2.70 | 28.6 | 1.79504 |
| 12 | −16.374 | 1.70 | | |
| 13 | −15.801 | 1.20 | 33.9 | 1.80384 |
| 14 | −37.433 | 2.30 | | |
| 15 | −14.363 | 1.30 | 45.4 | 1.79668 |
| 16 | −67.732 | 2.50 | | |
| 17 | 108.170 | 2.00 | 33.7 | 1.64831 |
| 18 | −46.371 | 0.16 | | CL |
| 19 | −34.655 | 1.00 | 46.5 | 1.80411 |
| 20 | 306.987 | (Bf) | | |
| f | 82.0016 | 92.0019 | 102.0009 | |
| d10 | 2.6966 | 1.9972 | 1.4350 | |
| Bf | 42.1113 | 50.2780 | 58.4436 | |
| Extension Amount δ of Master Lens M Upon Insertion of CL | | | | |
| Synthesized Focal Length: f | 82.0016 to 102.0009 | | | |
| Focal Length of M: $f_{MC}$ | 66.6420 to 77.0814 | | | |
| Extension Amount of M: δ | 8.7930 to 15.0948 | | | | where the variable focal length photographing lens serves as a master lens (M) for the conversion lens (CL), f is the synthesized focal length of the master lens M and the conversion lens CL, L represents the distance between the most image-side surface of the master lens M to the image plane in a state wherein the conversion lens CL is to be added, $f_{MC}$ is the focal length of the master lens M in a state where the conversion lens CL is to be added, $L_{CT}$ is the distance between the most image-side surface of the second lens group of the master lens M to the most object-side surface of the conversion lens CL in a state wherein the conversion lens CL is added, $f_{23}$ is the synthesized focal length of the focal length of the second group of the master lens M and the focal length of the conversion lens CL, $f_{Cl}$ is the focal length of the conversion lens CL, the numbers at the left side of the table represent the orders from the object side, r designates the radius of curvature of a lens surface, d designates a lens surface interval, v represents the Abbe number and n represents the refractive index for d line (λ=587.6 nm), Bf represents the back focal length.

11. An optical system of claim 1, constituted according to data in the following table:

| f: 82.0 to 102.0, L: 38.09 to 47.83 $f_{MC}$: 65.72 to 75.85 $L_{CT}$ = 0.2, $f_{23}$ = −20.7586, $f_{CL}$ = −168.3171 | | | | |
|---|---|---|---|---|
| | r | d | v | n |
| 1 | 18.075 | 3.30 | 58.5 | 1.65160 |
| 2 | 29.608 | 2.20 | | |
| 3 | −25.473 | 2.00 | 45.4 | 1.79668 |
| 4 | 9.973 | 5.80 | 41.4 | 1.57501 |
| 5 | −58.411 | 0.60 | | |
| 6 | 27.978 | 4.50 | 57.0 | 1.62280 |
| 7 | −11.948 | 1.70 | 23.0 | 1.86074 |

-continued

| | | | | | |
|---|---|---|---|---|---|
| 8 | −17.729 | 2.65 | | | |
| 9 | 162.604 | 1.20 | 32.2 | 1.67270 | M |
| 10 | −162.608 | (variable) | | | |
| 11 | −40.229 | 2.70 | 28.6 | 1.79504 | |
| 12 | −16.374 | 1.70 | | | |
| 13 | −15.801 | 1.20 | 33.9 | 1.80384 | |
| 14 | −37.433 | 2.30 | | | |
| 15 | −14.363 | 1.30 | 45.4 | 1.79668 | |
| 16 | −67.732 | 0.20 | | | |
| 17 | −150.505 | 2.00 | 35.5 | 1.59507 | |
| 18 | −29.802 | 1.30 | | | CL |
| 19 | −24.807 | 1.00 | 49.5 | 1.77279 | |
| 20 | −89.161 | (Bf) | | | |

| f | 82.0046 | 92.0053 | 102.0048 |
|---|---|---|---|
| d10 | 2.8278 | 2.1284 | 1.5662 |
| Bf | 43.0289 | 51.1962 | 59.3625 |

Extension Amount δ of Master Lens M Upon Insertion of CL

| | |
|---|---|
| Synthesized Focal Length: f | 82.0046 to 102.0048 |
| Focal Length of M: $f_{MC}$ | 65.7164 to 75.8459 |
| Extension Amount of M: δ | 9.4360 to 16.0370 | where the variable focal length photographing lens serves as a master lens (M) for the conversion lens (CL), f is the synthesized focal length of the master lens M and the conversion lens CL, L represents the distance between the most image-side surface of the master lens M to the image plane in a state wherein the conversion lens CL is to be added, $f_{MC}$ is the focal length of the master lens M in a state where the conversion lens CL is to be added, $L_{CT}$ is the distance between the most image-side surface of the second lens group of the master lens M to the most object-side surface of the conversion lens CL in a state wherein the conversion lens CL is added, $f_{23}$ is the synthesized focal length of the focal length of the second group of the master lens M and the focal length of the conversion lens CL, $f_{CL}$ is the focal length of the conversion lens CL, the numbers at the left side of the table represent the orders from the object side, r designates the radius of curvature of a lens surface, d designates a lens surface interval, ν represents the Abbe number and n represents the refractive index for d line (λ=587.6 nm), Bf represents the back focal length.

12. An optical system of claim 1, constituted according to data in the following table:

f: 70.0 to 90.0, L: 40.04 to 51.61
$f_{MC}$: 59.48 to 70.74
$L_{CT}$ = 1.8, $f_{23}$ = −16.3149, $f_{CL}$ = −181.5588

| | r | d | ν | n | |
|---|---|---|---|---|---|
| 1 | 52.620 | 1.50 | 45.4 | 1.79668 | |
| 2 | 12.324 | 2.80 | | | |
| 3 | 17.714 | 4.80 | 38.9 | 1.67163 | |
| 4 | −173.449 | 2.50 | | | |
| 5 | −20.925 | 4.20 | 45.4 | 1.79668 | |
| 6 | −27.098 | 1.30 | | | |
| 7 | 59.630 | 1.00 | 40.9 | 1.79631 | |
| 8 | 8.970 | 5.20 | 46.5 | 1.58267 | |
| 9 | −58.411 | 1.20 | | | |
| 10 | 47.490 | 4.60 | 59.0 | 1.51823 | |
| 11 | −9.869 | 2.00 | 25.4 | 1.80518 | M |
| 12 | −13.745 | 2.18 | | | |
| 13 | −21.772 | 1.20 | 59.0 | 1.51823 | |
| 14 | −18.012 | (variable) | | | |
| 15 | −56.933 | 3.30 | 41.5 | 1.57501 | |
| 16 | −14.612 | 1.40 | | | |
| 17 | −14.509 | 2.30 | 54.0 | 1.61720 | |
| 18 | 2309.522 | 4.40 | | | |
| 19 | −11.194 | 1.00 | 47.1 | 1.62374 | |
| 20 | −36.683 | 1.80 | | | |
| 21 | 36.088 | 2.50 | 40.8 | 1.58144 | |
| 22 | −25.039 | 0.30 | | | CL |
| 23 | −27.469 | 1.00 | 52.3 | 1.74810 | |
| 24 | 39.665 | (Bf) | | | |

| f | 69.9965 | 79.9971 | 89.9962 |
|---|---|---|---|
| d14 | 2.0227 | 1.4740 | 1.0473 |
| Bf | 40.1206 | 48.7849 | 57.4479 |

Extension Amount δ of Master Lens M Upon Insertion of CL

| | |
|---|---|
| Synthesized Focal Length: f | 69.9965 to 89.9962 |
| Focal Length of M: $f_{MC}$ | 59.4838 to 70.7423 |
| Extension Amount of M: δ | 5.6836 to 11.4362 | where the variable focal length photographing lens serves as a master lens (M) for the conversion lens (CL), f is the synthesized focal length of the master lens M and the conversion lens CL, L represents the distance between the most image-side surface of the master lens M to the image plane in a state wherein the conversion lens CL is to be added, $f_{MC}$ is the focal length of the master lens M in a state where the conversion lens CL is to be added, $L_{CT}$ is the distance between the most image-side surface of the second lens group of the master lens M to the most object-side surface of the conversion lens CL in a state wherein the conversion lens CL is added, $f_{23}$ is the synthesized focal length of the focal length of the second group of the master lens M and the focal length of the conversion lens CL, $f_{CL}$ is the focal length of the conversion lens CL, the numbers at the left side of the table represent the orders from the object side, r designates the radius of curvature of a lens surface, d designates a lens surface interval, ν represents the Abbe number and n represents the refractive index for d line (λ=587.6 nm), Bf represents the back focal length.

13. An optical system of claim 1, constituted according to data in the following table:

f: 70.0 to 90.0, L: 40.39 to 52.88
$f_{MC}$: 61.60 to 74.02
$L_{CT}$ = 1.0, $f_{23}$ = −16.7336, $f_{CL}$ = −217.1162

| | r | d | ν | n | |
|---|---|---|---|---|---|
| 1 | 49.763 | 1.50 | 45.4 | 1.79668 | |
| 2 | 12.223 | 2.80 | | | |
| 3 | 17.804 | 4.80 | 38.2 | 1.65128 | |
| 4 | −117.960 | 2.50 | | | |
| 5 | −20.603 | 4.20 | 40.9 | 1.79631 | |
| 6 | −26.173 | 1.30 | | | |
| 7 | 52.645 | 1.00 | 40.9 | 1.79631 | |
| 8 | 9.276 | 5.20 | 46.5 | 1.58267 | |
| 9 | −69.394 | 1.20 | | | |
| 10 | 51.684 | 4.60 | 70.4 | 1.48749 | |
| 11 | −10.366 | 2.00 | 25.4 | 1.80518 | M |
| 12 | −13.798 | 2.01 | | | |
| 13 | −35.887 | 1.20 | 70.0 | 1.51860 | |
| 14 | −25.338 | (variable) | | | |
| 15 | −40.025 | 2.50 | 40.9 | 1.79631 | |
| 16 | −15.070 | 1.80 | | | |
| 17 | −12.815 | 1.10 | 53.9 | 1.71300 | |
| 18 | −138.923 | 3.20 | | | |
| 19 | −13.816 | 2.10 | 54.0 | 1.71300 | |
| 20 | −49.714 | 1.00 | | | |
| 21 | 25.211 | 2.00 | 35.5 | 1.59507 | |
| 22 | −73.798 | 0.20 | | | CL |
| 23 | −128.098 | 1.00 | 39.8 | 1.86994 | |
| 24 | 28.052 | (Bf) | | | |

| f | 70.0001 | 79.9993 | 90.0011 |
|---|---|---|---|
| d14 | 4.0960 | 3.5168 | 3.0662 |
| d24 | 40.3052 | 48.9369 | 57.5709 |

Extension Amount δ of Master Lens M Upon Insertion of CL

| | |
|---|---|
| Synthesized Focal Length: f | 70.0001 to 90.0011 |
| Focal Length of M: $f_{MC}$ | 61.5953 to 74.0158 |
| Extension Amount of M: δ | 4.1134 to 8.8868 | where the variable focal length photographing lens serves as a master lens (M) for the conversion lens (CL), f is the synthesized focal length of the master lens M and the conversion lens CL, L represents the distance between the most image-side surface of the master lens M to the image plane in a state wherein the conversion lens CL is to be added, $f_{MC}$ is the focal length of the master lens M in a state where the conversion lens CL is to be added, $L_{CT}$ is the distance between the most image-side surface of the second lens group of the master lens M to the most object-side surface of the conversion lens CL in a state wherein the conversion lens CL is added, $f_{23}$ is the synthesized focal length of the focal length of the second group of the master lens M and the focal length of the conversion lens CL, $f_{CL}$ is the focal length of the conversion lens CL, the numbers at the left side of the table represent the orders from the object side, r designates the radius of curvature of a lens surface, d designates a lens surface interval, $\nu$ represents the Abbe number and n represents the refractive index for d line ($\lambda = 587.6$ nm), Bf represents the back focal length.

14. An optical system of claim 1, constituted according to data in the following table:

| f: 82.0 to 102.0, L: 38.98 to 94.01 $f_{MC}$: 66.44 to 77.08 $L_{CT} = 2.0$, $f_{23} = -20.4579$, $f_{CL} = -175.9777$ | | | | |
|---|---|---|---|---|
| | r | d | $\nu$ | n |
| 1 | 18.075 | 3.30 | 58.5 | 1.65160 |
| 2 | 29.608 | 2.20 | | |
| 3 | −25.473 | 2.00 | 45.4 | 1.79668 |
| 4 | 9.973 | 5.80 | 41.4 | 1.57501 |
| 5 | −58.411 | 0.60 | | |
| 6 | 27.978 | 4.50 | 57.0 | 1.62280 |
| 7 | −11.948 | 1.70 | 23.0 | 1.86074 |
| 8 | −17.729 | 2.65 | | |
| 9 | 162.604 | 1.20 | 32.2 | 1.67270 | M
| 10 | −162.608 | (variable) | | |
| 11 | 40.229 | 2.70 | 28.6 | 1.79504 |
| 12 | −16.374 | 1.70 | | |
| 13 | −15.801 | 1.20 | 33.9 | 1.80384 |
| 14 | −37.433 | 2.30 | | |
| 15 | −14.363 | 1.30 | 45.4 | 1.79668 |
| 16 | −67.732 | 2.50 | | |
| 17 | 214.466 | 2.00 | 33.75 | 1.64831 |
| 18 | −40.444 | 0.30 | | | CL
| 19 | −31.432 | 1.00 | 46.5 | 1.80411 |
| 20 | 1398.984 | (Bf) | | |

| f | 82.0013 | 92.0015 | 102.0000 |
|---|---|---|---|
| d10 | 2.6966 | 1.9972 | 1.4350 |
| Bf | 46.2102 | 54.3773 | 62.5433 |

| Extension Amount δ of Master Lens M Upon Insertion of CL | |
|---|---|
| Synthesized Focal Length: f | 82.0013 to 102.0000 |
| Focal Length of M: $f_{MC}$ | 66.6421 to 77.0815 |
| Extension Amount of M: δ | 8.7868 to 15.0886 |

| [Anti-vibration Moving Amount] Focal Length | 0.5 mm Correction on Image Plane Correction Amount |
|---|---|
| 82.0 | 2.15 |
| 92.0 | 1.80 |
| 102.0 | 1.55 | where the variable focal length photographing lens serves as a master lens (M) for the conversion lens (CL), f is the synthesized focal length of the master lens M and the conversion lens CL, L represents the distance between the most image-side surface of the master lens M to the image plane in a state wherein the conversion lens CL is to be added, $f_{MC}$ is the focal length of the master lens M in a state where the conversion lens CL is to be added, $L_{CT}$ is the distance between the most image-side surface of the second lens group of the master lens M to the most object-side surface of the conversion lens CL in a state wherein the conversion lens CL is added, $f_{23}$ is the synthesized focal length of the focal length of the second group of the master lens M and the focal length of the conversion lens CL, $f_{CI}$ is the focal length of the conversion lens CL, the numbers at the left side of the table represent the orders from the object side, r designates the radius of curvature of a lens surface, d designates a lens surface interval, $\nu$ represents the Abbe number and n represents the refractive index for d line ($\lambda = 587.6$ nm), Bf represents the back focal length.

15. A compound zoom lens capable of varying a zooming range, including:

a variable focal length photographing lens, consisting of a first lens group having a positive refracting power, and a second lens group having a negative refracting power from an object side in turn, for changing a focal length by changing a group interval between said first and second lens groups;

a conversion lens separably added to an image side of said variable focal length photographing lens, and movable along an optical axis simultaneously with at least one of said first and second lens groups of said variable focal length photographing lens so as to change a synthesized focal length with said variable focal length photographing lens;

variable focal length photographing lens moving means for relatively moving said first and second lens groups along the optical axis so as to continuously change the focal length of said variable focal length photographing lens;

conversion lens holding means for holding said conversion lens on the optical axis;

conversion lens displacing means for displacing said conversion lens from a position on the optical axis to a predetermined retreat position outside a photographing optical path; and conversion lens moving means for moving said conversion lens held on the optical axis by said conversion means holding means simultaneously with at least one of said first and second lens groups so as to change the synthesized focal length of said variable focal length photographing lens and said conversion lens.

16. A lens according to claim 15, wherein said variable focal length photographing lens moving means includes a first lens group holding member for holding said first lens group, a second lens group holding member for holding said second lens group, and a cam cylinder which has a pair of cam grooves and is rotated about the optical axis to relatively move said first and second lens group holding members along the optical axis, said conversion lens holding means includes a conversion lens holding member for holding said conversion lens, a support shaft, arranged at a predetermined position of said second lens group holding member, for rotatably supporting said conversion lens holding member in a plane perpendicular to the optical axis, and a spring member for biasing said conversion lens holding member, and said conversion lens displacing means includes a pivot ring, rotatably supported by said second lens group holding member, for rotating and displacing said conversion lens holding member against a biasing force of said spring member so as to cause said conversion lens holding member to retreat outside the photographing optical path, and a manual operation member capable of externally pivoting said pivot ring so as to displace said conversion lens between the optical axis and the retreat position outside the photographing optical path.

17. A lens according to claim 16, further including:
cam cylinder moving means for allowing movement of said cam cylinder along the optical axis by only a predetermined distance at only a rotation position of said cam cylinder corresponding to a predetermined focal length of said variable focal length photographing lens, and inhibiting rotation of said cam cylinder during movement of said cam cylinder along the optical axis.

18. A lens according to claim 17, wherein said cam cylinder moving means includes a stationary cylinder fitted on an outer circumferential surface of said cam cylinder, an engaging pin projecting from said cam cylinder, first and second cam grooves, engaged with said engaging pin and formed on said stationary cylinder to extend in a circumferential direction, for guiding rotation of said cam cylinder, and a straight guide groove connecting said first and second cam grooves to extend in a direction of the optical axis, and said manual operation member has a restriction groove for inhibiting passage of said engaging pin in said straight guide groove, for, when said engaging pin is moved from said first cam groove to said second cam groove, displacing said conversion lens onto the optical axis, for, when said engaging pin is moved from said second cam groove to said first cam groove, allowing passage of said engaging pin so as to displace said conversion lens to the retreat position only when said manual operation member is operated.

19. A lens according to claim 16, further including a reversible motor for rotating said cam cylinder, and electrical control means for controlling said reversible motor, and wherein said cam cylinder has a pair of first cam grooves corresponding to a change in focal length by only said variable focal length photographing lens, and a pair of second cam grooves formed to extend tele ends of said first cam grooves, and corresponding to a change in synthesized focal length of said variable focal length photographing lens and said conversion lens, and said electrical control means includes switch means for controlling said reversible motor so as to move said first and second lens group holding members beyond the tele ends of said first cam grooves in accordance with an operation of said manual operation member for displacing said conversion lens onto the optical axis, and for controlling said reversible motor so as to move said first and second lens group holding members to the tele ends of said first cam grooves beyond wide-angle ends of said second cam grooves in accordance with an operation of said manual operation member for retreating said conversion lens from the optical axis.

20. A lens according to claim 15, wherein said variable focal length photographing lens moving means includes a first lens group holding member for holding said first lens group, a second lens group holding member for holding said second lens group, two feed screws, arranged to be parallel to the optical axis, for independently moving said first and second lens group holding members along the optical axis, first and second reversible motors for respectively rotating said two feed screws, and a control device for controlling said first and second reversible motors so as to relatively move said first and second lens group holding members along the optical axis, said conversion lens holding means includes a conversion lens holding member for holding said conversion lens, a support shaft for rotatably supporting said conversion lens holding member in a plane including the optical axis, and a spring member for biasing said conversion lens holding member, said conversion lens moving means includes a feed screw, arranged to be parallel to the optical axis, for moving said conversion lens holding means along the optical axis, a third reversible motor for rotating said feed screw, and a control device for controlling said third reversible motor to move said conversion lens held on the optical axis by said conversion lens holding means simultaneously with at least one of said first and second lens groups so as to change the synthesized focal length of said variable focal length photographing lens and said conversion lens, and said conversion lens displacing means includes a gear fixed to said conversion lens holding member, and a rack, arranged at a stationary position outside a path of said second lens group holding member, for, when said third reversible motor is rotated in a reverse direction and said conversion lens holding means is fed to a predetermined position along the optical axis, meshing with said gear to rotate and displace said conversion lens holding member to a retreat position outside the photographing optical path against the biasing force of said spring member.

21. A lens according to claim 20, wherein said conversion lens holding member includes a conversion lens holding frame for holding said conversion lens, an interval member which projects from said conversion lens holding frame and abuts against an image-side surface of said second lens group to maintain a predetermined air interval between said conversion lens and said second lens group, and spring means for biasing said conversion lens holding frame along the optical axis.

* * * * *